US012104727B2

(12) United States Patent
Chlystek et al.

(10) Patent No.: US 12,104,727 B2
(45) Date of Patent: Oct. 1, 2024

(54) LINE RETAINER

(71) Applicant: Illinois Tool Works Inc., Glenview, IL (US)

(72) Inventors: Thomas M. Chlystek, Darien, IL (US); Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/914,210

(22) PCT Filed: Apr. 5, 2021

(86) PCT No.: PCT/US2021/025745
§ 371 (c)(1),
(2) Date: Sep. 23, 2022

(87) PCT Pub. No.: WO2021/211316
PCT Pub. Date: Oct. 21, 2021

(65) Prior Publication Data
US 2023/0124107 A1 Apr. 20, 2023

Related U.S. Application Data

(60) Provisional application No. 63/164,342, filed on Mar. 22, 2021, provisional application No. 63/119,286, (Continued)

(51) Int. Cl.
*F16L 3/13* (2006.01)
(52) U.S. Cl.
CPC ..................... *F16L 3/13* (2013.01)
(58) Field of Classification Search
CPC .................. F16L 3/13; F16L 3/1041
(Continued)

(56) References Cited

U.S. PATENT DOCUMENTS 4,437,633 A * 3/1984 Andre ................. B60R 16/0215
248/68.1
4,566,660 A * 1/1986 Anscher ................... F16L 3/13
24/453

(Continued)

FOREIGN PATENT DOCUMENTS

GB 2081363 A 2/1982

OTHER PUBLICATIONS

International Search Report and Written Opinion from International Application No. PCT/US2021/025745, mailed Aug. 9, 2021 (21 pages).

*Primary Examiner* — Christopher Garft
(74) *Attorney, Agent, or Firm* — Neal, Gerber & Eisenberg LLP

(57) ABSTRACT

Various embodiments of the present disclosure provide a line retainer including a body that includes a first side wall and a second side wall spaced apart from the first side wall. The side walls at least partially define a slot configured to receive any one of a plurality of differently-sized lines. The side walls define an opening of the slot. The line retainer includes a set of opposing legs extending into the slot from the first and second side walls adjacent the front and rear support walls and a first set of opposing arms extending into the slot from the first and second side walls adjacent the opening. The line retainer includes a second set of opposing arms extending into the slot from the first and second side walls between the first set of opposing arms and the set of opposing legs.

16 Claims, 23 Drawing Sheets

Related U.S. Application Data filed on Nov. 30, 2020, provisional application No. 63/010,292, filed on Apr. 15, 2020.

(58) Field of Classification Search
USPC .................................................. 248/63, 74.2
See application file for complete search history.

(56) References Cited

U.S. PATENT DOCUMENTS

| | | | | |
|---|---|---|---|---|
| 4,840,334 | A * | 6/1989 | Kikuchi | ................... F16L 3/13 24/453 |
| 5,184,794 | A * | 2/1993 | Saito | ........................ F16L 3/13 248/74.1 |
| 5,271,587 | A * | 12/1993 | Schaty | .................... H02G 3/26 248/74.1 |
| 5,460,342 | A * | 10/1995 | Dore | ....................... F16L 3/223 248/68.1 |
| 6,216,986 | B1 * | 4/2001 | Kwilosz | ................... F16L 3/13 248/74.1 |
| 6,371,419 | B1 * | 4/2002 | Ohnuki | .................... F16L 3/13 248/74.2 |
| 8,684,321 | B2 | 4/2014 | Shirakabe et al. | |
| 9,016,639 | B2 | 4/2015 | Kuhm et al. | |
| 9,453,593 | B2 | 9/2016 | Pearson et al. | |
| 2010/0155545 | A1 | 6/2010 | Birli et al. | |
| 2020/0340602 | A1 * | 10/2020 | Kumar | ................. F16L 3/1203 |

* cited by examiner

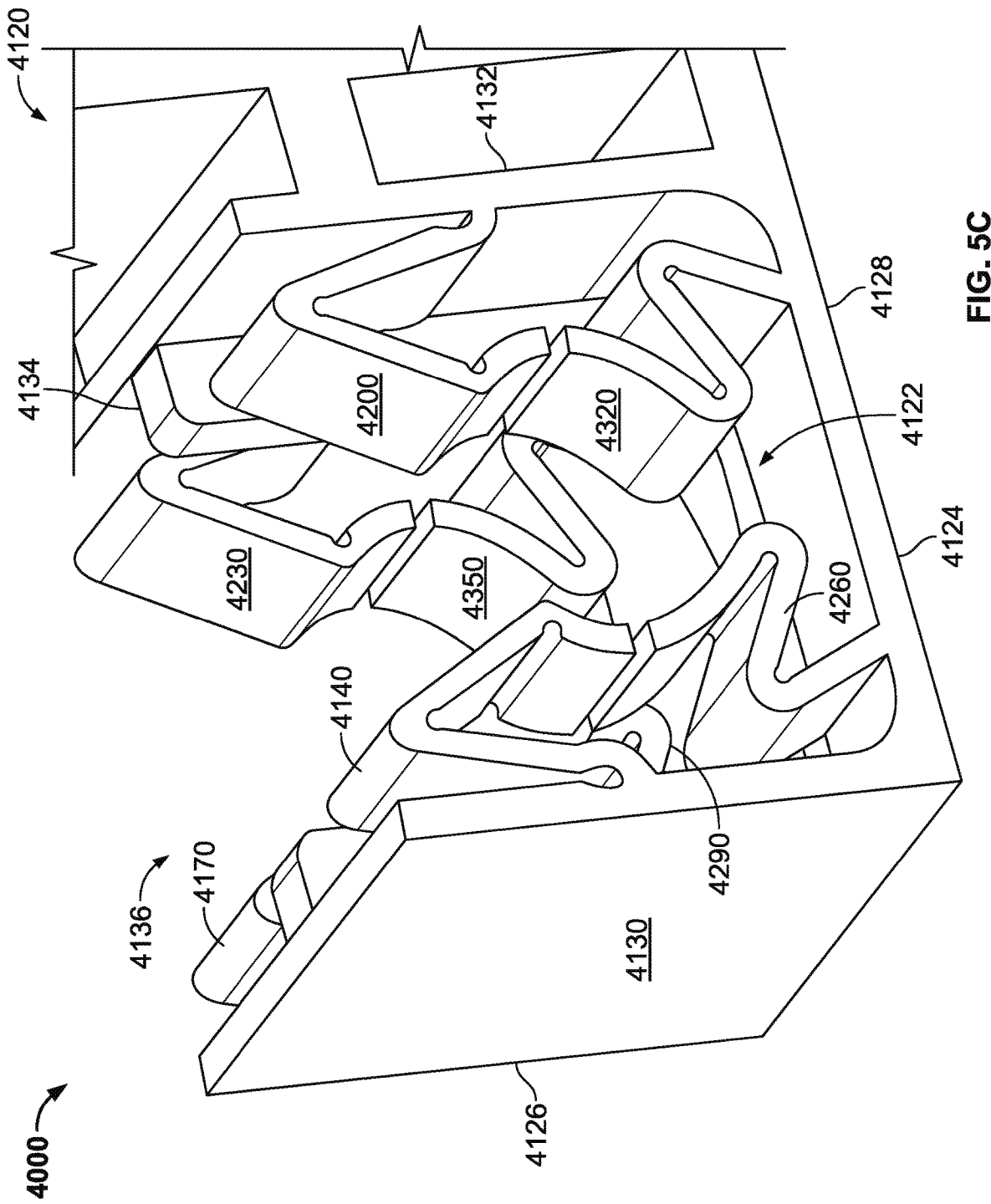

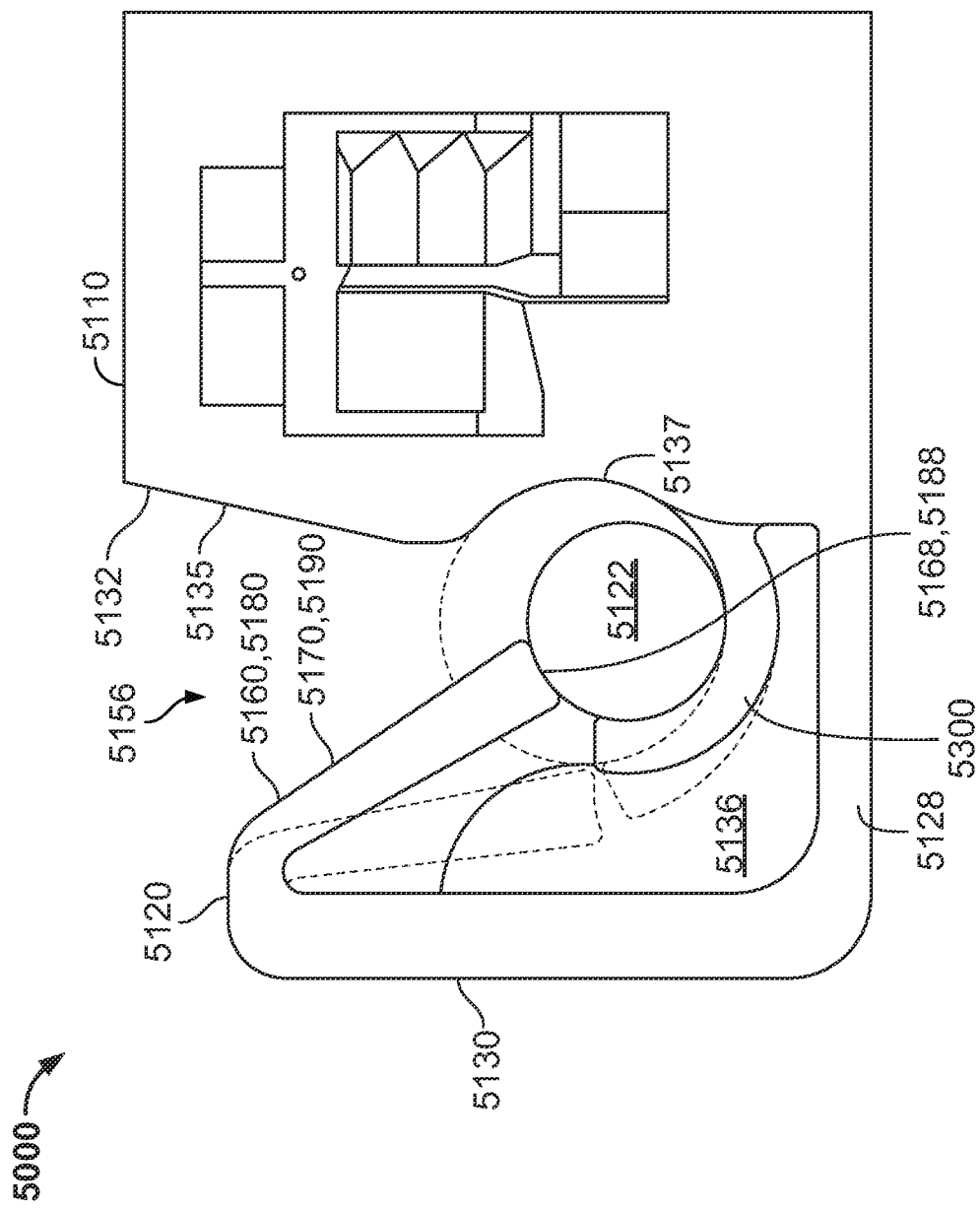

LINE RETAINER

PRIORITY

This application is a national stage application of PCT/US2021/025745, filed on Apr. 5, 2021, which claims priority to and the benefit of U.S. Provisional Patent Application Ser. No. 63/010,292, filed Apr. 15, 2020, U.S. Provisional Patent Application Ser. No. 63/119,286, filed Nov. 30, 2020 and U.S. Provisional Patent Application No. 63/164,342, filed Mar. 22, 2021 the entire contents of each of which are incorporated by reference herein.

BACKGROUND

Typically, a vehicle has various lines of electrical wiring (such as for lights, power windows, and other electronic devices) and tubes (such as for fuel, coolant, washer fluid, etc.) that route throughout sections of the vehicle. Various retainers have been developed to fasten the lines of electrical wiring and tubes to sections of the vehicle.

Various known retainers are configured to snap onto sections of the vehicle. These known retainers include outer walls that define a slot configured to receive and house a wire or tube. Various known retainers are configured to house a single size of a wire or tube. As a result, multiple differently-sized retainers are typically needed to secure the various differently-sized lines of a vehicle, which may increase stocking time and costs as well as assembly time and cost. Therefore, there remains a continuing need for a retainer that is capable of securing a relatively wide range of differently-sized lines to sections of a vehicle.

SUMMARY

Various embodiments of the present disclosure provide a line retainer that can securely retain any one of a range of differently-sized lines to streamline inventory and assembly processes and reduce cost.

An example line retainer of the present disclosure includes a body including a first side wall and a second side wall spaced apart from the first side wall. The first and second side walls partially define a line-receiving slot configured to receive any one of a plurality of differently-sized lines including a first-sized line and a different second-sized line. The first-sized line has a larger outer diameter than that of the second-sized line. The first and second side walls define an opening of the line-receiving slot. The example line retainer includes a set of opposing legs extending into the line-receiving slot from the first and second side walls and a first set of opposing arms extending into the line-receiving slot from the first and second side walls adjacent the opening. The first set of opposing arms are engageable with the first-sized line when the first-sized line is positioned in the line-receiving slot. The example line retainer includes a second set of opposing arms extending into the line-receiving slot from the first and second side walls between the first set of opposing arms and the set of opposing legs. The first set of opposing arms are engageable with the second-sized line when the second-sized line is positioned in the line-receiving slot.

Another example line retainer of the present disclosure includes a body including a base wall, a first side wall extending from the base wall, and a second side wall extending from the base wall and spaced apart from the first side wall. The base wall and the first and second side walls define a line-receiving slot engageable with any one of a plurality of differently-sized lines. The first and second side walls define an opening of the line-receiving slot that is opposite the base wall. The example line retainer includes a first set of opposing legs extending into the line-receiving slot from the first and second side walls adjacent the base wall and a set of opposing arms extending into the line-receiving slot from the first and second side walls adjacent the opening. Each arm of the set of opposing arms includes a proximal segment extending from the first side wall or the second side in a direction at least partially away from the base wall, an intermediate segment that extends from the proximal segment in a direction at least partially toward the base wall and inwardly toward the line-receiving slot, and a distal segment extending into the line-receiving slot from the intermediate segment in a direction at least partially toward the base wall.

Another example line retainer of the present disclosure includes a body including a base wall, a first side wall extending from the base wall, and a second side wall extending from the base wall and spaced apart from the first side wall. The base wall and the first and second side walls define a line-receiving slot configured to receive any one of a plurality of differently-sized lines. The first and second side walls define an opening of the line-receiving slot that is opposite the base wall. The example line retainer includes a set of opposing legs extending into the line-receiving slot from the base wall. Each leg of the set of opposing legs includes a proximal leg segment extending inwardly and toward the opening, an intermediate leg segment extending inwardly and toward the base wall at a first acute angle relative to the proximal leg segment, and a distal leg segment extending outwardly and toward the base wall at a second acute angle relative to the intermediate leg segment. The distal segment defines a line-retainment leg surface. The example line retainer includes a set of opposing arms extending into the line-receiving slot from the first and second side walls adjacent the opening. Each arm of the set of opposing arms includes a proximal arm segment extending inwardly and toward the opening, an intermediate arm segment extending inwardly and toward the base wall at a third acute angle relative to the proximal arm segment, and a distal arm segment extending outwardly and toward the base wall at an obtuse angle relative to the intermediate arm segment. The distal arm segment defines a line-retainment arm surface.

Other objects, features, and advantages of the present disclosure will be apparent from the following detailed disclosure and accompanying drawings.

BRIEF DESCRIPTION OF THE FIGURES

FIG. 5C is a fragmentary perspective view of the portion of the line retainer of FIG. 5A.

FIG. 6 is a front view of an example line retainer of one embodiment of the present disclosure.

DETAILED DESCRIPTION

Figure 1A:
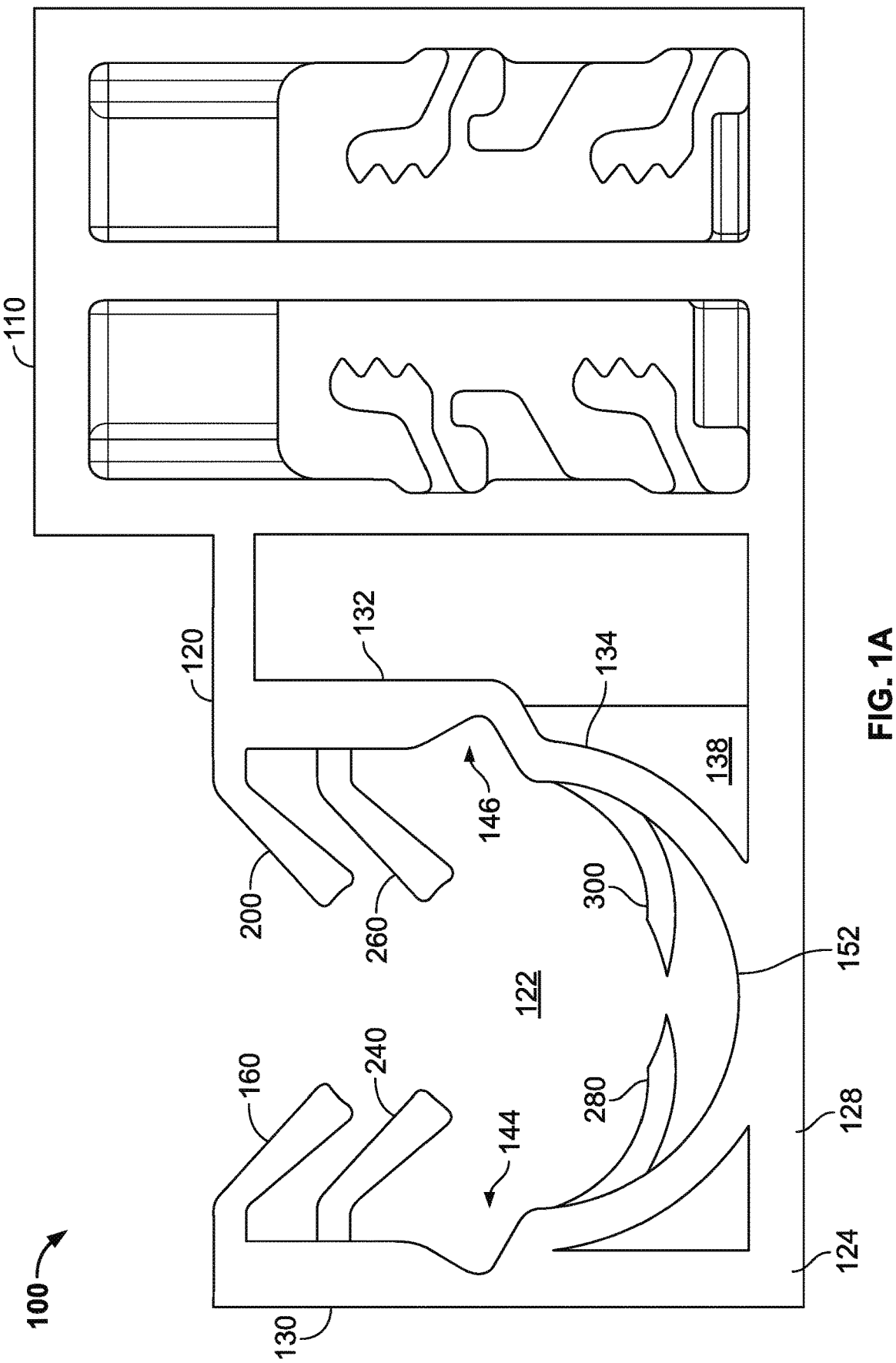
FIG. 1A is a front view of an example line retainer of one embodiment of the present disclosure.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Various embodiments of the present disclosure provide a line retainer for one or more lines, such as lines of wiring and/or tubing, that can securely retain any one of a range of differently-sized lines. In various embodiments of the present disclosure, the line retainer is configured to retain any one of a range of lines with different outer diameters to reduce the quantity of different line retainers that need to be purchased, stocked, and tracked, and/or to reduce the assembly time by reducing the quantity of different components that are used to assemble a vehicle. It should be appreciated that the liner retainer of the present disclosure is not limited to use in assembly of a vehicle.

In various embodiments of the present disclosure, the line retainer includes a body having a base wall and opposing side walls extending from the base wall. The body, and in particular, the base wall and the opposing side walls define a line-receiving slot having an opening opposite the base wall. The line retainer further includes: (1) a set of opposing arms extending inwardly into the slot from the opposing side walls adjacent the opening of the slot, and (2) a set of opposing legs extending inwardly into the slot from the base wall and/or from the opposing side walls adjacent the base wall. The opposing set of arms and the opposing set of legs are resilient (to a certain degree), flexible (to a certain degree), and arranged to engage lines with differently-sized outer diameters to enable the line retainer to securely retain any of those lines with differently-sized outer diameters within the line-receiving slot. Generally, the arms are configured to (1) flex in a direction generally toward the base wall of the body to facilitate insertion of the line into the slot when a suitable insertion force is applied, and (2) resist flexing in a direction generally toward the opening of the slot to deter the line from being removed from the slot until a suitable extraction force is applied. In various embodiments, the insertion force is substantially less than the extraction force. Additionally, the sets of arms and the sets of legs are configured to suitably grip the line to inhibit the line from sliding axially out of the slot.

As used herein, a "set of opposing" arms or legs refers to two or more arms or legs that are arranged in an opposing configuration. A first non-limiting example set of opposing arms includes one arm extending from a first side wall and another arm extending from a second side wall in an opposing configuration. Another non-limiting example set of opposing arms includes two or more arms extending from a first side wall and another two or more arms extending from a second side wall in an opposing configuration. Another non-limiting example set of opposing arms includes one arm extending from a first side wall and another two or more arms extending from a second side wall in an opposing configuration.

Turning now to the figures, FIGS. 1A, 1B, 1C, 1D, and 1E illustrate one example embodiment of a line retainer of the present disclosure that is generally indicated by numeral 100. As best shown in FIG. 1A, the illustrated example line retainer 100 includes: (1) a frame 110 configured to connect onto a section of a vehicle, and (2) a body 120 defining a line-receiving slot 122 that is configured to receive and retain any one of a plurality of differently-sized lines having different outer diameters. The frame 110 includes any suitable connection mechanism(s) to attach the line retainer 100 to a section of the vehicle. The body 120 extends from and is integrally and specifically monolithically suitably formed (such as via molding) with the frame 110 of the line retainer 100. In this illustrated example embodiment, the body 120 defines one slot to enable the line retainer 100 to retain one line at a time. It should be appreciated that the body can alternatively define multiple line-receiving slots that are arranged next to each other or that are spaced apart to enable the line retainer of the present disclosure to simultaneously retain multiple lines.

The body 120 of the illustrated example line retainer 100 includes: (1) a front end 124, (2) a rear end 126 opposite the front end 124, (3) a base wall 128, (4) a first side wall 130 connected to the base wall 128 and extending between the front end 124 and the rear end 126, (5) a second side wall 132 connected to the base wall 128 and extending between the front end 124 and the rear end 126 opposite and spaced apart from the first side wall 130, (6) a front support wall 134 connected to the base wall 128, the first side wall 130, and the second side wall 132, and extending along the front end 124, (7) a rear support wall 136 connected to the base wall 128, the first side wall 130, and the second side wall 132, and extending along the rear end 126 opposite and spaced apart from the front support wall 134, and (8) a central support post 138.

Figure 1B:
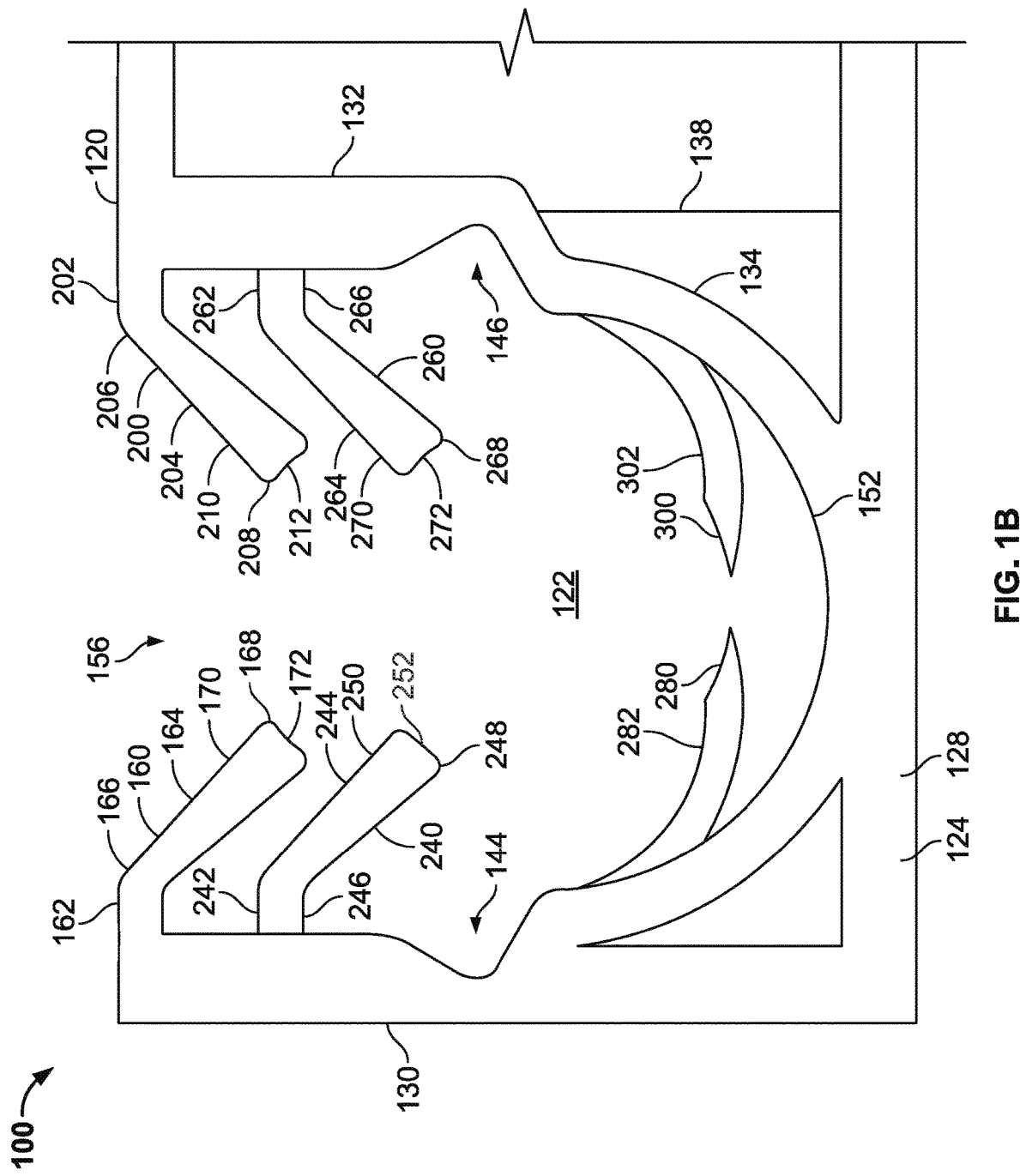
FIG. 1B is a fragmentary front view of a portion of the line retainer of FIG. 1A.
Figure 1C:
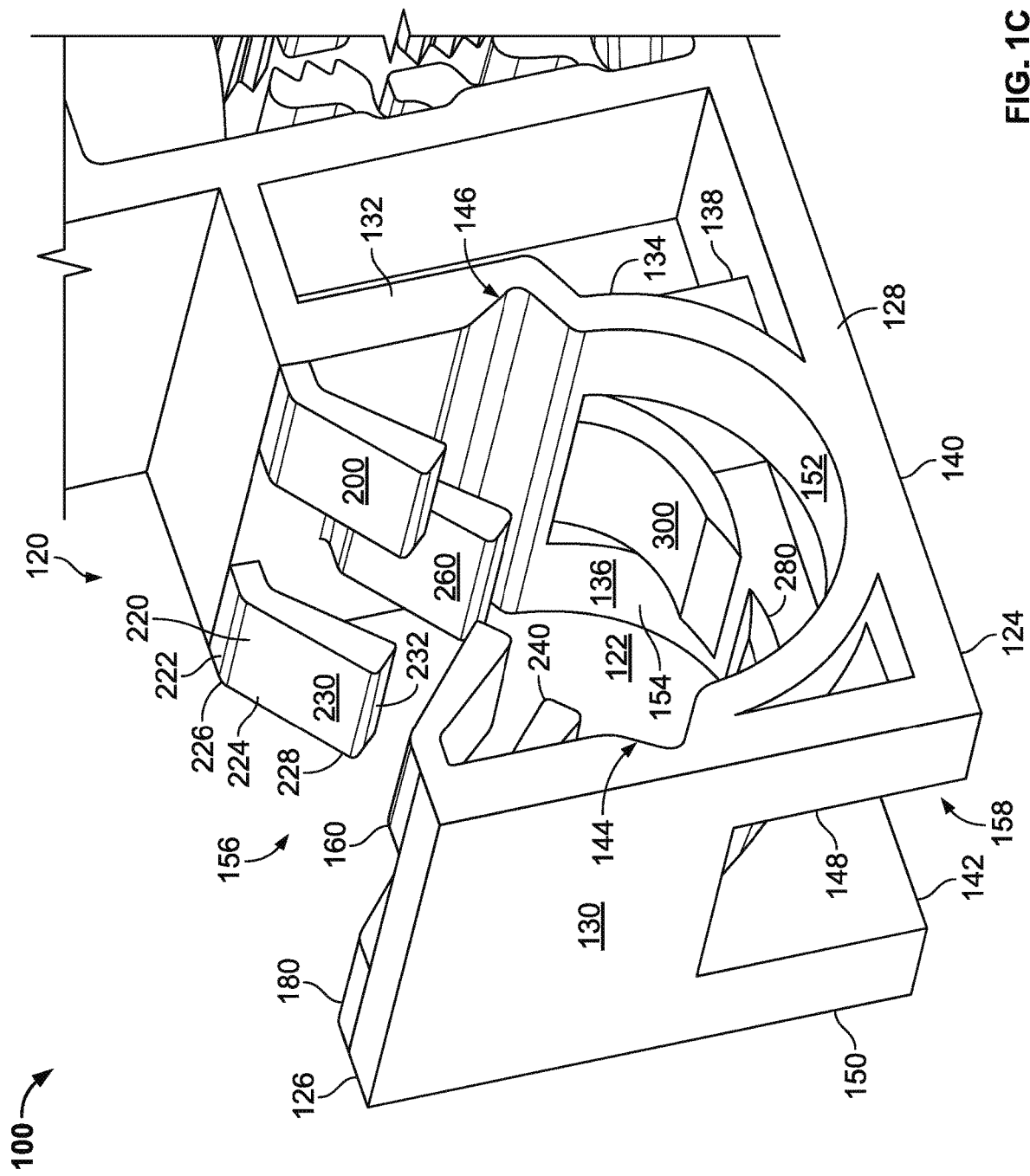
FIG. 1C is a fragmentary perspective view of the portion of the line retainer of FIG. 1A.

As best shown in FIG. 1C, the base wall 128 includes: (1) a front extension 140 extending along the front end 124, and (2) a rear extension 142 extending along the rear end 126 opposite and spaced apart from the front extension 140.

Figure 1D:
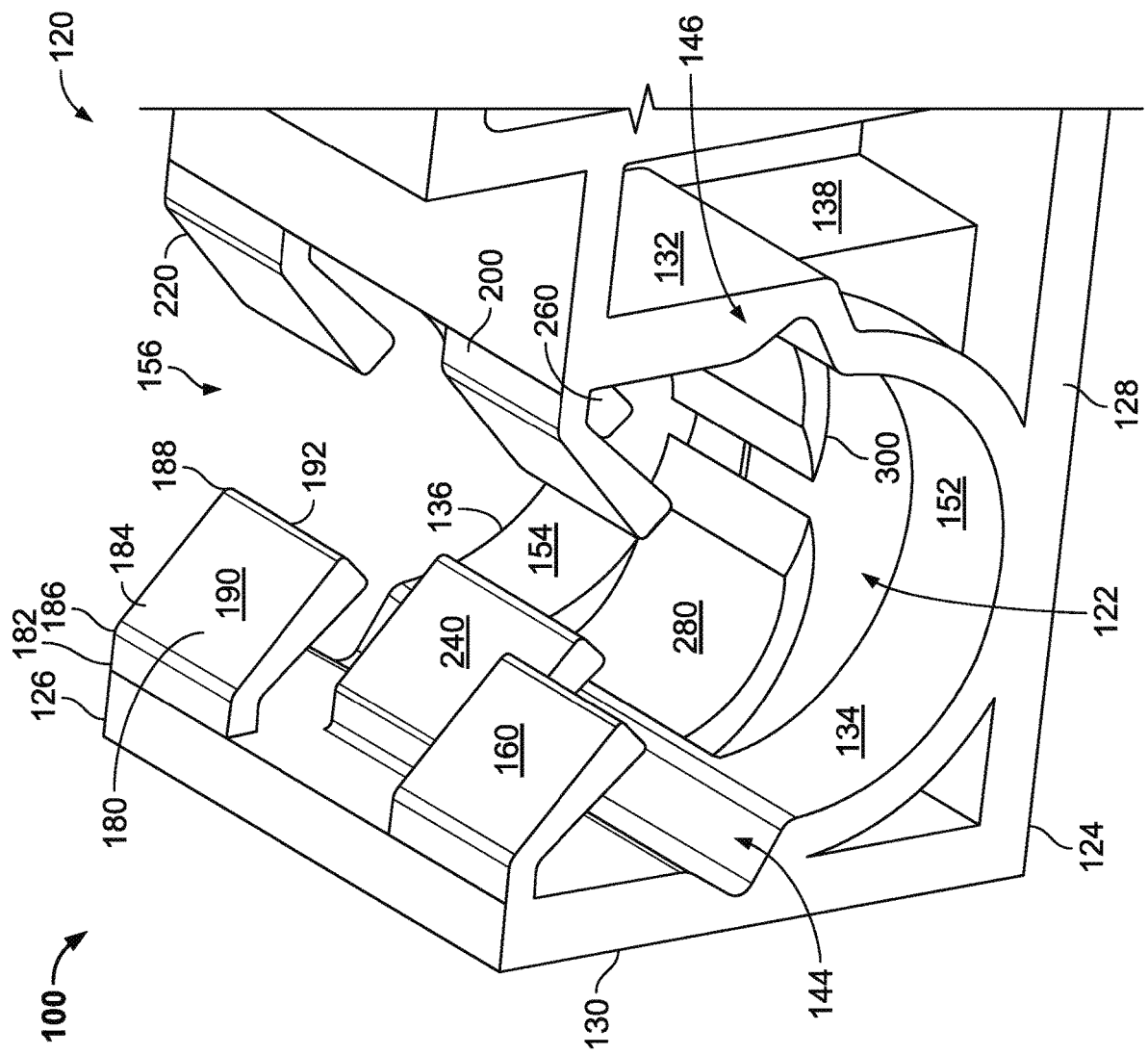
FIG. 1D is another fragmentary perspective view of the portion of the line retainer of FIG. 1A.

As best shown in FIGS. 1C and 1D, the first and second side walls 130 and 132 each extend between the front end 124 and the rear end 126 to define a depth of the body 120 of the line retainer 100. The first side wall 130 defines a first indentation 144 and the second side wall 132 defines a second indentation 146. The first side wall 130 includes: (1) a front support post 148 extending along the front end 124 transversely from the front extension 140 of the base wall 128, and (2) a rear support post 150 extending along the rear end 126 transversely from the rear extension 142 of the base wall 128 and opposite and spaced apart from the front support post 148.

The front support wall 134 extends along the front end 124 transversely from the front extension 140 between the first side wall 130 and the second side wall 132. The rear support wall 136 extends along the rear end 126 transversely from the rear extension 142 between the first side wall 130 and the second side wall 132 and opposite and spaced apart from the front support wall 134. The front support wall 134 forms a circumferential arc having a lowest point connected to the front extension 140, and the rear support wall 136 forms a circumferential arc having a lowest point connected to the rear extension 142. The front support wall 134 defines a front line-contact surface 152 that is circumferentially arced and configured to contact and support a line, and the rear support wall 136 defines a rear line-contact surface 154 that is circumferentially arced and configured to contact and support a line.

The first and second side walls 130 and 132 and the front and rear support walls 134 and 136 define the line-receiving slot 122 configured to receive any one of a plurality of differently-sized lines having different outer diameters and in which such line is configured to be securely retained. The first and second side walls 130 and 132 also define an opening 156 of the line-receiving slot 122 that is opposite the base wall 128 such that any of such different lines can be inserted into the line-receiving slot 122 through the opening 156. The front extension 140 and the front support wall 134 are opposite and spaced apart from the rear extension 142 and the rear support wall 136 to define a gap 158 that extends between the first side wall 130 and the second side wall 132.

The illustrated example line retainer 100 also includes: (1) a first set of opposing arms 160, 180, 200, and 220 extending into the line-receiving slot 122 respectively from the first and second side walls 130 and 132 adjacent the opening 156, (2) a second set of opposing arms 240 and 260 extending into the line-receiving slot 122 respectively from the first and second side walls 130 and 132, and (3) a set of opposing legs 280 and 300 extending into the line-receiving slot 122 respectively from the first and second side walls 130 and 132 adjacent the front and rear support walls 134 and 136.

As best shown in FIGS. 1C and 1D, the first set of opposing arms 160, 180, 200, and 220 includes: (1) a first arm 160 that extends from the first side wall 130 adjacent the front end 124 of the body 120, (2) a second arm 180 that extends from the first side wall 130 adjacent the rear end 126 of the body 120, (3) a third arm 200 that extends from the second side wall 132 adjacent the front end 124 and opposite the first arm 160, and (4) a fourth arm 220 that extends from the second side wall 132 adjacent the rear end 126 and opposite the second arm 180. The second arm 180 is longitudinally aligned with and spaced apart from the first arm 160. The fourth arm 220 is longitudinally aligned with and spaced apart from the third arm 200.

Figure 1E:
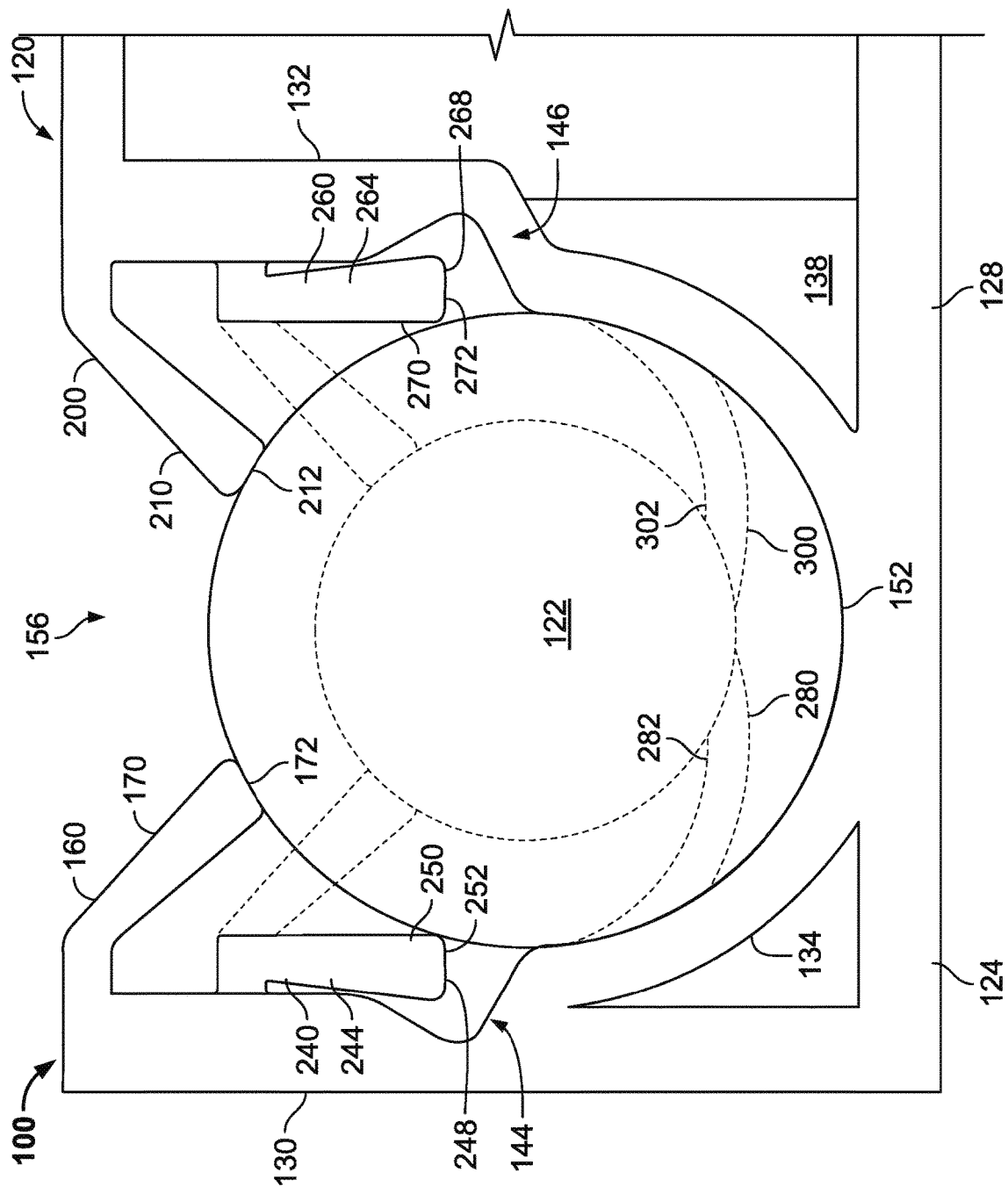
FIG. 1E is a fragmentary front view that depicts arms and legs of the line retainer of FIG. 1A in a set of solid lines when retaining a first-sized line and in a set of dashed lines when alternatively retaining a second-sized line.

As best shown in FIG. 1B, the first arm 160 includes: (1) a first segment 162 that extends inwardly from the first side wall 130, and (2) a second segment 164 that extends from the first segment 162. The second segment 164 includes: (1) a proximal end 166 that is connected to the first segment 162, (2) a distal end 168 opposite the proximal end 166, (3) a line-contact surface 170 that extends between the proximal end 166 and the distal end 168, and (4) a line-retention surface 172 at and/or adjacent to the distal end 168. The second segment 164 is angled toward the base wall 128 of the body 120 such that the distal end 168 is the portion of the first arm 160 that is closest to the base wall 128. As best shown in FIG. 1E, the first arm 160 is biased toward a rest position at which the second segment 164 is angled at an obtuse angle toward the base wall 128 relative to the first segment 162.

Similarly, as best shown in FIG. 1D, the second arm 180 includes: (1) a first segment 182 that extends inwardly from the first side wall 130, and (2) a second segment 184 that extends from the first segment 182. The second segment 184 includes: (1) a proximal end 186 that is connected to the first segment 182, (2) a distal end 188 opposite the proximal end 186, (3) a line-contact surface 190 that extends between the proximal end 186 and the distal end 188, and (4) a line-retention surface 192 at and/or adjacent to the distal end 188. The second segment 184 is angled toward the base wall 128 of the body 120 such that the distal end 188 is the portion of the second arm 180 that is closest to the base wall 128. The second arm 180 is biased toward a rest position at which the second segment 194 is angled at an obtuse angle toward the base wall 128 relative to the first segment 182.

Similarly, as best shown in FIG. 1B, the third arm 200 includes: (1) a first segment 202 that extends inwardly from the second side wall 132 and (2) a second segment 204 that extends from the first segment 202. The second segment 204 includes: (1) a proximal end 206 that is connected to the first segment 202, (2) a distal end 208 opposite the proximal end 206, (3) a line-contact surface 210 that extends between the proximal end 206 and the distal end 208, and (4) a line-retention surface 212 at and/or adjacent to the distal end 208. The second segment 204 is angled toward the base wall 128 of the body 120 such that the distal end 208 is the portion of the third arm 200 that is closest to the base wall 128. The third arm 200 is biased toward a rest position at which the second segment 204 is angled at an obtuse angle toward the base wall 128 relative to the first segment 202.

Similarly, as best shown in FIG. 1C, the fourth arm 220 includes: (1) a first segment 222 that extends inwardly from the second side wall 132 and (2) a second segment 224 that extends from the first segment 222. The second segment 224 includes: (1) a proximal end 226 that is connected to the first segment 222, (2) a distal end 228 opposite the proximal end 226, (3) a line-contact surface 230 that extends between the proximal end 226 and the distal end 228, and (4) a line-retention surface 232 at and/or adjacent to the distal end 228. The second segment 224 is angled toward the base wall 128 of the body 120 such that the distal end 228 is the portion of the fourth arm 220 that is closest to the base wall 128. The fourth arm 220 is biased toward a rest position at which the second segment 224 is angled at an obtuse angle toward the base wall 128 relative to the first segment 222.

The second set of opposing arms 240 and 260 includes: (1) a fifth arm 240 that extends from the first side wall 130 of the body 120, and (2) a sixth arm 260 that extends from the second side wall 132 opposite the fifth arm 240. The fifth arm 240 extends from the first side wall 130 between (1) the first and second arms 160 and 180 and (2) the base wall 128. More specifically, the fifth arm 240 extends from the first side wall 130 between (1) the first and second arms 160 and 180, and (2) the first indentation 144 defined by the first side wall 130. Similarly, the sixth arm 260 extends from the second side wall 132 between (1) the third and fourth arms 200 and 220 and (2) the base wall 128. More specifically, the sixth arm 260 extends from the second side wall 132 between (1) the third and fourth arms 200 and 220, and (2) the second indentation 146 defined by the second side wall 132. Each of the second set of opposing arms 240 and 260 is also offset from and located centrally between the front end 124 and the rear end 126 of the body 120.

As best shown in FIG. 1B, the fifth arm 240 includes: (1) a first segment 242 that extends inwardly from the first side wall 130, and (2) a second segment 244 that extends from the first segment 242. The second segment 244 includes: (1) a proximal end 246 that is connected to the first segment 242, (2) a distal end 248 opposite the proximal end 246, (3) a line-contact surface 250 that extends between the proximal end 246 and the distal end 248, and (4) a line-retention surface 252 at and/or adjacent to the distal end 248. The second segment 244 is angled toward the base wall 128 of the body 120 such that the distal end 248 is the portion of the fifth arm 240 that is closest to the base wall 128. As best shown in FIG. 1E, the fifth arm 240 is biased toward a rest position at which the second segment 244 is angled at an obtuse angle toward the base wall 128 relative to the first segment 242.

Similarly, as best shown in FIG. 1B, the sixth arm 260 includes: (1) a first segment 262 that extends inwardly from the second side wall 132, and (2) a second segment 264 that extends from the first segment 262. The second segment 264 includes: (1) a proximal end 266 that is connected to the first segment 262, (2) a distal end 268 opposite the proximal end 266, (3) a line-contact surface 270 that extends between the proximal end 266 and the distal end 268, and (4) a line-retention surface 272 at and/or adjacent to the distal end 268. The second segment 264 is angled toward the base wall 128 of the body 120 such that the distal end 268 is the portion of the sixth arm 260 that is closest to the base wall 128. The sixth arm 260 is biased toward a rest position at which the second segment 264 is angled at an obtuse angle toward the base wall 128 relative to the first segment 262.

The set of opposing legs 280 and 300 of the illustrated example line retainer 100 includes: (1) a first leg 280 that extends from the first side wall 130 of the body 120, and (2) a second leg 300 that extends from the second side wall 132 opposite the first leg 280. The first leg 280 has a concave shape and is offset from and located centrally between the front end 124 and the rear end 126 of the body 120. The first leg 280 has a line-contact surface 282 that has a concave shape and is configured to receive and engage a portion of the line. Similarly, the second leg 300 has a concave shape and is offset from and located centrally between the front end 124 and the rear end 126 of the body 120. The second leg 300 has a line-contact surface 302 that has a concave shape and is configured to receive and engage a portion of the line.

The frame 110; the body 120; the first set of opposing arms 160, 180, 200, and 220; the second set of opposing arms 240 and 260; and the set of opposing legs 280 and 300 of the illustrated example line retainer 100 are integrally and specifically monolithically suitably formed (such as via molding) of a semi-rigid material, such as but not limited to nylon, acetyl, and/or other plastic(s) or combinations thereof. The semi-rigid material enables the first set of opposing arms 160, 180, 200, and 220; the second set of opposing arms 240 and 260; and the set of opposing legs 280 and 300 to (1) flex to enable any one of a plurality of differently-sized lines having different outer diameters to be inserted into the line-receiving slot 122 through the opening 156 and (2) to accommodate such lines having different outer diameters (such as outer diameters between about 8 millimeters and 12 millimeters). The flexibility of the semi-rigid material and the arrangement of the first set of opposing arms 160, 180, 200, and 220 and the second set of opposing arms 240 and 260 enable any such line to be inserted into the line-receiving slot 122 with an insertion force that can be easily applied by an assembler. The rigidity of the semi-rigid material and the arrangement of the first set of opposing arms 160, 180, 200, and 220 and the second set of opposing arms 240 and 260 also provide a rigidity that inhibits the line from being removed from the line-receiving slot 122 through the opening 156 unless an extraction force that is greater than the insertion force is applied.

As best shown by the set of solid lines in FIG. 1E, the first set of opposing arms 160, 180, 200, and 220 is configured to engage a first-sized line (such as a line having a 12 millimeter outer diameter) when the first-sized line is positioned within the line-receiving slot 122 to securely retain the first-sized line within the line-receiving slot 122. The distal ends 168, 188, 208, and 228 of the second segments 164, 184, 204, and 224 of the first set of opposing arms 160, 180, 200, and 220 are thicker than the respective proximal ends 166, 186, 206, and 226 to increase the rigidity of the first set of opposing arms 160, 180, 200, and 220 and, in turn, substantially increase the extraction force required to remove the first-sized line from the line-receiving slot 122.

As best shown by the set of dashed lines in FIG. 1E, the second set of opposing arms 240 and 260 is configured to engage a different second-sized line (such as a line having an 8 millimeter outer diameter) when the second-sized line is positioned within the line-receiving slot 122 to securely retain the second-sized line within the line-receiving slot 122. The distal ends 248 and 268 of the second segments 244 and 264 of the second set of opposing arms 240 and 260 are thicker than the respective proximal ends 246 and 266 to increase the rigidity of the second set of opposing arms 240 and 260 and, in turn, substantially increase the extraction force required to remove the second-sized line from the line-receiving slot 122.

As best shown by FIG. 1E, each of the set of opposing legs 280 and 300 is configured to engage any one of a plurality of differently-sized lines. For example, when the second-sized line is positioned within the line-receiving slot 122, the line-contact surfaces 282 and 302 of the respective set of opposing legs 280 and 300 are configured to engage the second-sized line in respective rest positions of the set of opposing legs 280 and 300. When the first-sized line is positioned within the line-receiving slot 122, the line-contact surfaces 282 and 302 are configured to engage the first-sized line, and the set of opposing legs 280 and 300 are configured to flex at least partially into the gap 158 to accommodate the larger outer diameter of the first-sized line.

The first set of opposing arms 160, 180, 200, and 220 and the second set of opposing arms 240 and 260 are staggered with respect to each other to facilitate retainment of any one of a plurality of differently-sized lines within the line-receiving slot 122. For example, the staggered arrangement of the first set of opposing arms 160, 180, 200, and 220 and the second set of opposing arms 240 and 260 (1) prevent the second set of opposing arms 240 and 260 from impeding the flexing of the first set of opposing arms 160, 180, 200, and 220 as a line is inserted through the opening 156 and (2) inhibit the line from sliding out of either end of the line-receiving slot 122. The set of opposing legs 280 and 300 and the first set of opposing arms 160, 180, 200, and 220 also are staggered with respect to each other to facilitate retainment of any one of the plurality of differently-sized lines within the line-receiving slot 122.

When a line is inserted through the opening 156 toward the line-receiving slot 122, the line-contact surfaces 170, 190, 210, and 230 of the first set of opposing arms 160, 180, 200, and 220 engage the line and the second segments 164, 184, 204, and 224 flex outwardly from their respective rest positions toward the first and second side walls 130 and 132. As the line is pushed further into the opening 156, the line-contact surfaces 250 and 270 of the second set of opposing arms 240 and 260 engage the line and the second segments 244 and 264 flex outwardly from their respective rest positions toward the first and second side walls 130 and 132. The distal ends 248 and 268 of the second set of opposing arms 240 and 260 are configured to pivot at least partially into the first and second indentations 144 and 146, respectively, to enable the line to be positioned within the line-receiving slot 122. The first set of opposing arms 160, 180, 200, and 220 are configured to snap back and return to their respective rest positions once the line is pushed far enough into the line-receiving slot 122 to clear the first set of opposing arms 160, 180, 200, and 220. Similarly, the second set of opposing arms 240 and 260 are configured to snap back and return to their respective rest positions once the line is pushed far enough into the line-receiving slot 122 to clear the second set of opposing arms 240 and 260. The line-contact surfaces 282 and 302 of the respective set of opposing legs 280 and 300 are configured to engage the line once the line is inserted into the line-receiving slot 122. Additionally, depending on the outer diameter of the line, the set of opposing legs 280 and 300 are configured to flex at least partially into the gap 158, and the front and rear line-contact surfaces 152 and 154 of the respective front and rear support walls 134 and 136 once the line is inserted into the line-receiving slot 122.

For example, the solid set of lines of FIG. 1E depict a relatively large-sized line (such as a line having a 12 millimeter outer diameter) retained with the line-receiving slot 122. When the line is pushed into the line-receiving slot 122 through the opening 156 via an insertion force, the line first engages the line-contact surfaces 170, 190, 210, and 230 of the second segments 164, 184, 204, and 224 of the first set of opposing arms 160, 180, 200, and 220 and causes the second segments 164, 184, 204, and 224 to flex outwardly. The line then engages the line-contact surfaces 250 and 270 of the second set of opposing arms 240 and 260 and causes the second segments 244 and 264 to flex outwardly from their respective rest positions into the first and second indentations 144 and 146. Subsequently, the line engages the line-contact surfaces 282 and 302 of the respective set of opposing legs 280 and 300 and pushes the set of opposing legs 280 and 300 to flex at least partially into the gap 158. The line reaches a retained position within the line-receiving slot 122 once the line engages and rests on the front and rear line-contact surfaces 152 and 154 of the respective front and rear support walls 134 and 136. Once the line is pushed into the retained position, the distal ends 168, 188, 208, and 228 of the first set of opposing arms 160, 180, 200, and 220 snap back and return to their respective rest positions to deter the line from being removed through the opening 156. As best shown in FIG. 1E, the line-contact surfaces 282 and 302 of the set of opposing legs 280 and 300; the line-contact surfaces 250 and 270 of the second set of opposing arms 240 and 260; and/or the line-retention surfaces 172, 192, 212, and 232 of the first set of opposing arms 160, 180, 200, and 220 engage the line in the retained position to secure the line within the line-receiving slot 122.

The dashed set of lines of FIG. 1E depict a relatively small-sized line (such as a line having an 8 millimeter outer diameter) retained with the line-receiving slot 122. When the line is pushed into the line-receiving slot 122 through the opening 156, the line first engages the line-contact surfaces 170, 190, 210, and 230 of the second segments 164, 184, 204, and 224 of the first set of opposing arms 160, 180, 200, and 220 and causes the second segments 164, 184, 204, and 224 to flex outwardly. The line then engages the line-contact surfaces 250 and 270 of the second set of opposing arms 240 and 260 and causes the second segments 244 and 264 to flex outwardly from their respective rest positions toward the first and second indentations 144 and 146. The distal ends 168, 188, 208, and 228 of the first set of opposing arms 160, 180, 200, and 220 subsequently snap back to their respective rest positions as the line continues to be pushed into the line-receiving slot 122 and disengages from the first set of opposing arms 160, 180, 200, and 220. Once the line is pushed into a retained position within the line-receiving slot 122, the distal ends 248 and 268 of the second set of opposing arms 240 and 260 snap back to their respective rest positions to deter the line from being removed through the opening 156. Additionally, the line engages and rests on the line-contact surfaces 282 and 302 of the set of opposing legs 280 and 300, which remain in their respective rest positions upon receiving the line. When the line is in the retained position within the line-receiving slot 122, the line-retention surfaces 252 and 272 of the second set of opposing arms 240 and 260 and the line-contact surfaces 282 and 302 of the set of opposing legs 280 and 300 engage the line to secure the line within the line-receiving slot 122.

When an intermediate-sized line (such as a third-sized line having a 10 millimeter outer diameter) is pushed into the line-receiving slot 122 through the opening 156, the line first engages the line-contact surfaces 170, 190, 210, and 230 of the second segments 164, 184, 204, and 224 of the first set of opposing arms 160, 180, 200, and 220 and causes the second segments 164, 184, 204, and 224 to flex outwardly. The line then engages the line-contact surfaces 250 and 270 of the second set of opposing arms 240 and 260 and causes the second segments 244 and 264 to flex outwardly from their respective rest positions toward the first and second indentations 144 and 146. Subsequently, the line engages the line-contact surfaces 282 and 302 of the set of opposing legs 280 and 300 and pushes the set of opposing legs 280 and 300 to flex to an intermediate position at least partially within the gap 158. The distal ends 168, 188, 208, and 228 of the first set of opposing arms 160, 180, 200, and 220 then snap back to their respective rest positions as the line continues to be pushed into the line-receiving slot 122 and disengages from the first set of opposing arms 160, 180, 200, and 220. When the line is pushed into a retained position within the line-receiving slot 122, the second set of opposing arms 240 and 260 are in an intermediate position between the first and second indentations 144 and 146 and their respective rest positions. In the intermediate position, the line-contact surfaces 250 and 270 of the second set of opposing arms 240 and 260 remain engaged with the line to secure the line within the line-receiving slot 122. When the line is in the retained position within the line-receiving slot 122, (1) the second segments 244 and 264 of the respective second set of opposing arms 240 and 260 and (2) the line-contact surfaces 282 and 302 of the set of opposing legs 280 and 300 engage the line to secure the line within the line-receiving slot 122.

Figure 2A:
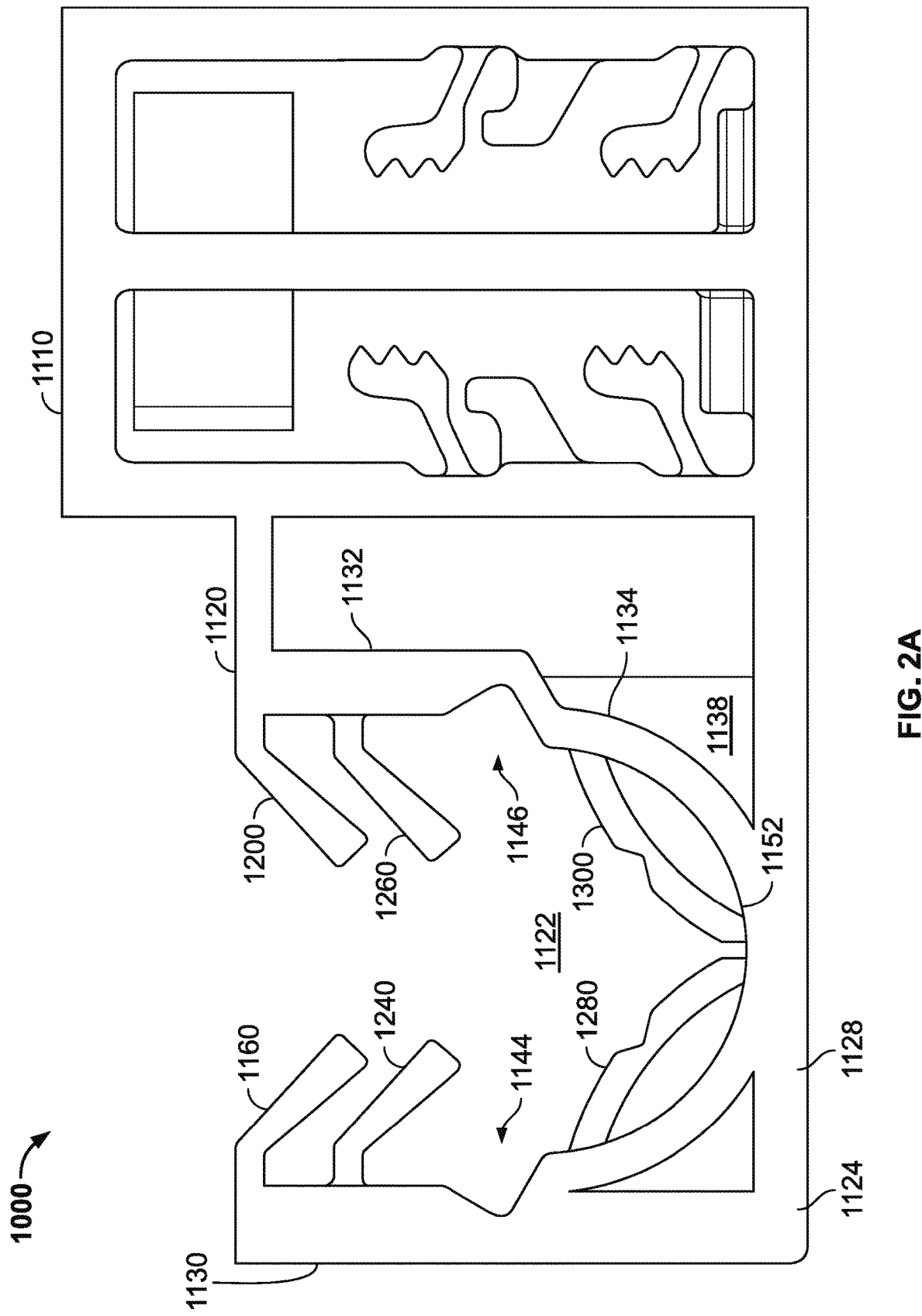
FIG. 2A is a front view of an example line retainer of another embodiment of the present disclosure.

FIGS. 2A, 2B, 2C, 2D, and 2E illustrate another example embodiment of a line retainer of the present disclosure that is generally indicated by numeral 1000. As best shown in FIG. 2A, the illustrated example line retainer 1000 includes: (1) a frame 1110 configured to connect onto a section of a vehicle, and (2) a body 1120 defining a line-receiving slot 1122 that is configured to receive and retain any one of a plurality of different lines having different outer diameters. The frame 1110 includes any suitable connection mechanism(s) to attach the line retainer 1000 to a section of the vehicle. The body 1120 extends from and is integrally formed and specifically monolithically suitably formed (such as via molding) with the frame 1110 of the line retainer 1000. In this illustrated example embodiment, the body 1120 defines one slot to enable the line retainer 1000 to retain one line at a time. It should be appreciated that the body can alternatively define multiple line-receiving slots that are arranged next to each other or that are spaced apart to enable the line retainer of the present disclosure to simultaneously retain multiple lines.

The body 1120 of the illustrated example line retainer 1000 includes: (1) a front end 1124, (2) a rear end 1126 opposite the front end 1124, (3) a base wall 1128, (4) a first side wall 1130 connected to the base wall 1128 and extending between the front end 1124 and the rear end 1126, (5) a second side wall 1132 connected to the base wall 1128 and extending between the front end 1124 and the rear end 1126 opposite and spaced apart from the first side wall 1130, (6) a front support wall 1134 connected to the base wall 1128, the first side wall 1130, and the second side wall 1132, and extending along the front end 1124, (7) a rear support wall 1136 connected to the base wall 1128, the first side wall 1130, and the second side wall 1132, and extending along the rear end 1126 opposite and spaced apart from the front support wall 1134, and (8) a central support post 1138.

Figure 2B:
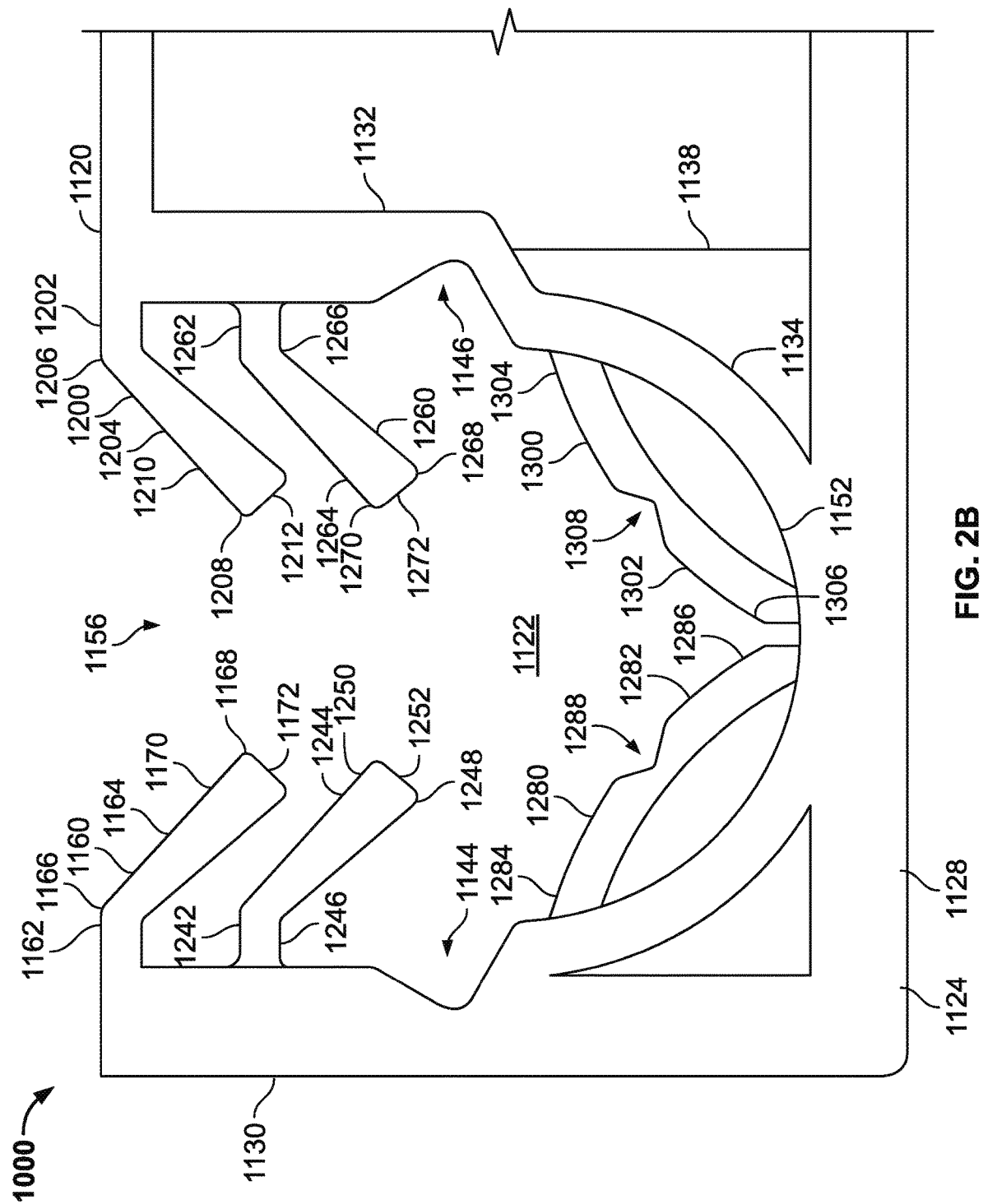
FIG. 2B is a fragmentary front view of a portion of the line retainer of FIG. 2A.
Figure 2C:
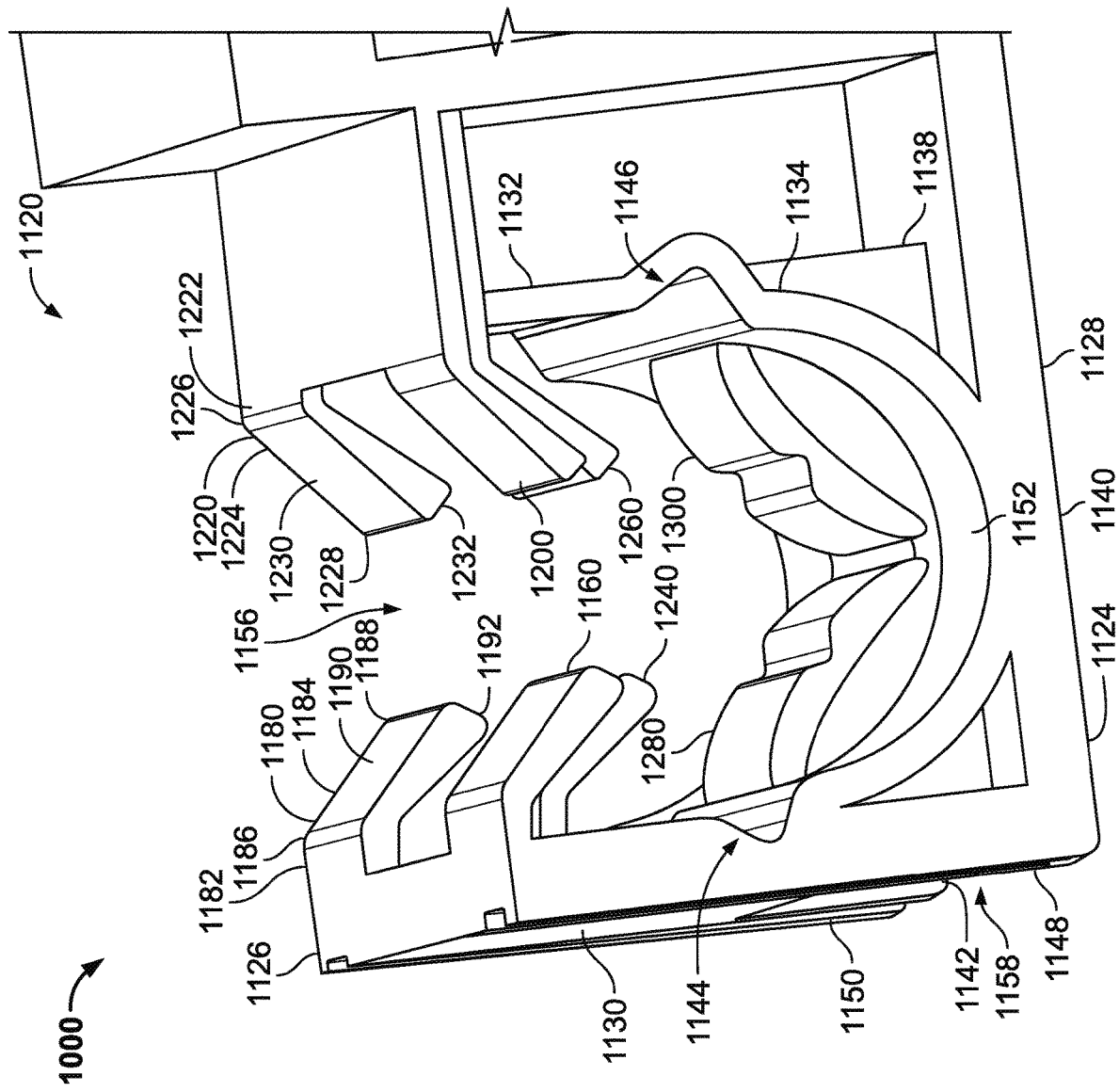
FIG. 2C is a fragmentary perspective view of the portion of the line retainer of FIG. 2A.

As best shown in FIG. 2C, the base wall 1128 includes: (1) a front extension 1140 extending along the front end 1124, and (2) a rear extension 1142 extending along the rear end 1126 opposite and spaced apart from the front extension 1140.

Figure 2D:
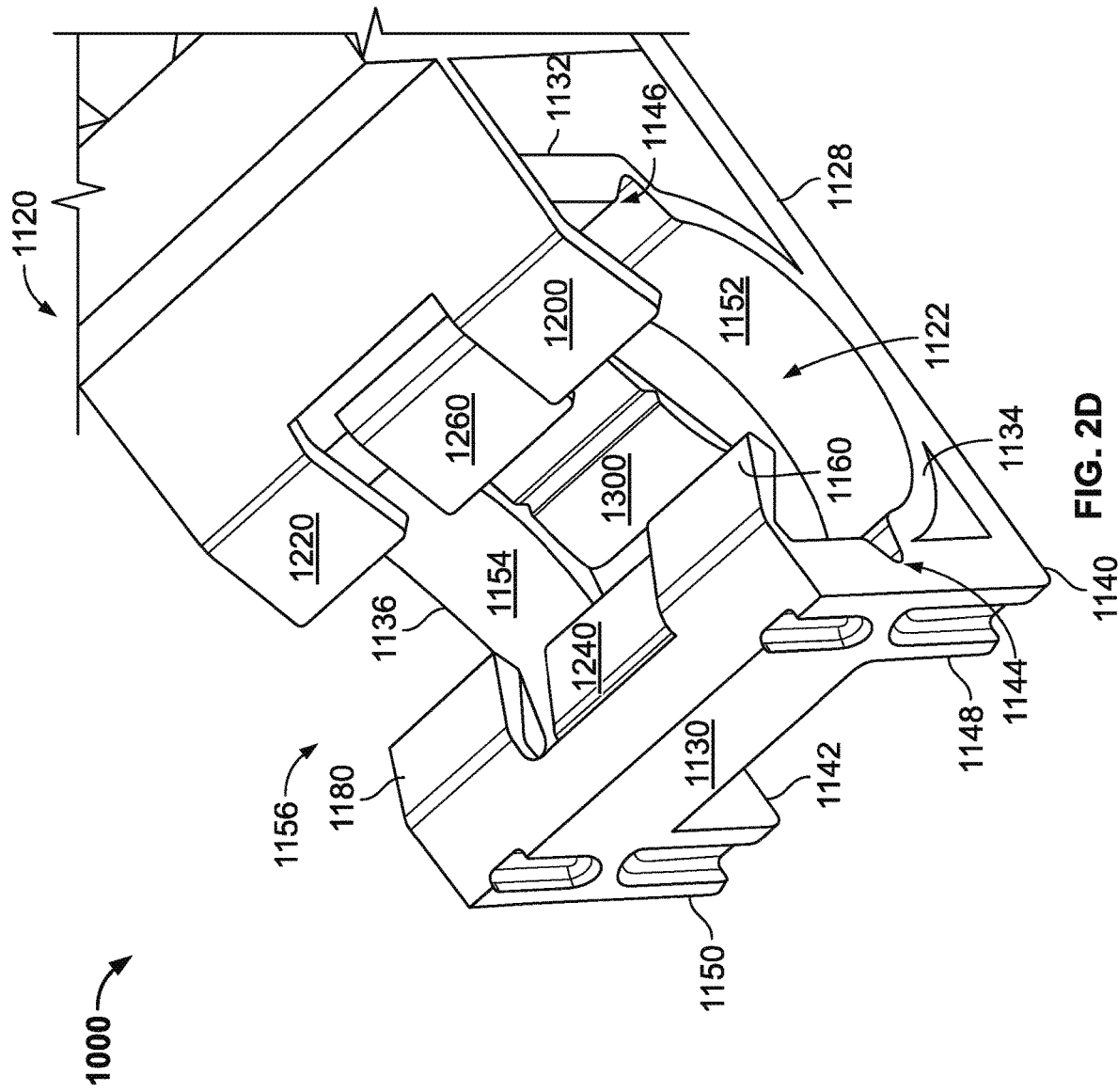
FIG. 2D is another fragmentary perspective view of the portion of the line retainer of FIG. 2A.

As best shown in FIGS. 2C and 2D, the first and second side walls 1130 and 1132 each extend between the front end 1124 and the rear end 1126 to define a depth of the body 1120 of the line retainer 1000. The first side wall 1130 defines a first indentation 1144 and the second side wall 1132 defines a second indentation 1146. The first side wall 1130 includes: (1) a front support post 1148 extending along the front end 1124 transversely from the front extension 1140 of the base wall 1128, and (2) a rear support post 1150 extending along the rear end 1126 transversely from the rear extension 1142 of the base wall 1128 and opposite and spaced apart from the front support post 1148.

The front support wall 1134 extends along the front end 1124 transversely from the front extension 1140 between the first side wall 1130 and the second side wall 1132. The rear support wall 1136 extends along the rear end 1126 transversely from the rear extension 1142 between the first side wall 1130 and the second side wall 1132 and opposite and spaced apart from the front support wall 1134. The front support wall 1134 forms a circumferential arc having a lowest point connected to the front extension 1140, and the rear support wall 1136 forms a circumferential arc having a lowest point connected to the rear extension 1142. The front support wall 1134 defines a front line-contact surface 1152 that is circumferentially arced and configured to contact and support a line, and the rear support wall 1136 defines a rear line-contact surface 1154 that is circumferentially arced and configured to contact and support a line.

The first and second side walls 1130 and 1132 and the front and rear support walls 1134 and 1136 define the line-receiving slot 1122 configured to receive any one of a plurality of different lines having different outer diameters and in which such line is configured to be securely retained. The first and second side walls 1130 and 1132 also define an opening 1156 of the line-receiving slot 1122 that is opposite the base wall 1128 such that any of such different lines can be inserted into the line-receiving slot 1122 through the opening 1156. The front extension 1140 and the front support wall 1134 are opposite and spaced apart from the rear extension 1142 and the rear support wall 1136 to define a gap 1158 that extends between the first side wall 1130 and the second side wall 1132.

The illustrated example line retainer 1000 also includes: (1) a first set of opposing arms 1160, 1180, 1200, and 1220 extending into the line-receiving slot 1122 respectively from the first and second side walls 1130 and 1132 adjacent the opening 1156, (2) a second set of opposing arms 1240 and 1260 extending into the line-receiving slot 1122 respectively from the first and second side walls 1130 and 1132, and (3) a set of opposing legs 1280 and 1300 extending into the line-receiving slot 1122 respectively from the first and second side walls 1130 and 1132 adjacent the front and rear support walls 1134 and 1136.

As best shown in FIGS. 2C and 2D, the first set of opposing arms 1160, 1180, 1200, and 1220 includes: (1) a first arm 1160 that extends from the first side wall 1130 adjacent the front end 1124 of the body 1120, (2) a second arm 1180 that extends from the first side wall 1130 adjacent the rear end 1126 of the body 1120, (3) a third arm 1200 that extends from the second side wall 1132 adjacent the front end 1124 and opposite the first arm 1160, and (4) a fourth arm 1220 that extends from the second side wall 1132 adjacent the rear end 1126 and opposite the second arm 1180. The second arm 1180 is longitudinally aligned with and spaced apart from the first arm 1160. The fourth arm 1220 is longitudinally aligned with and spaced apart from the third arm 1200.

Figure 2E:
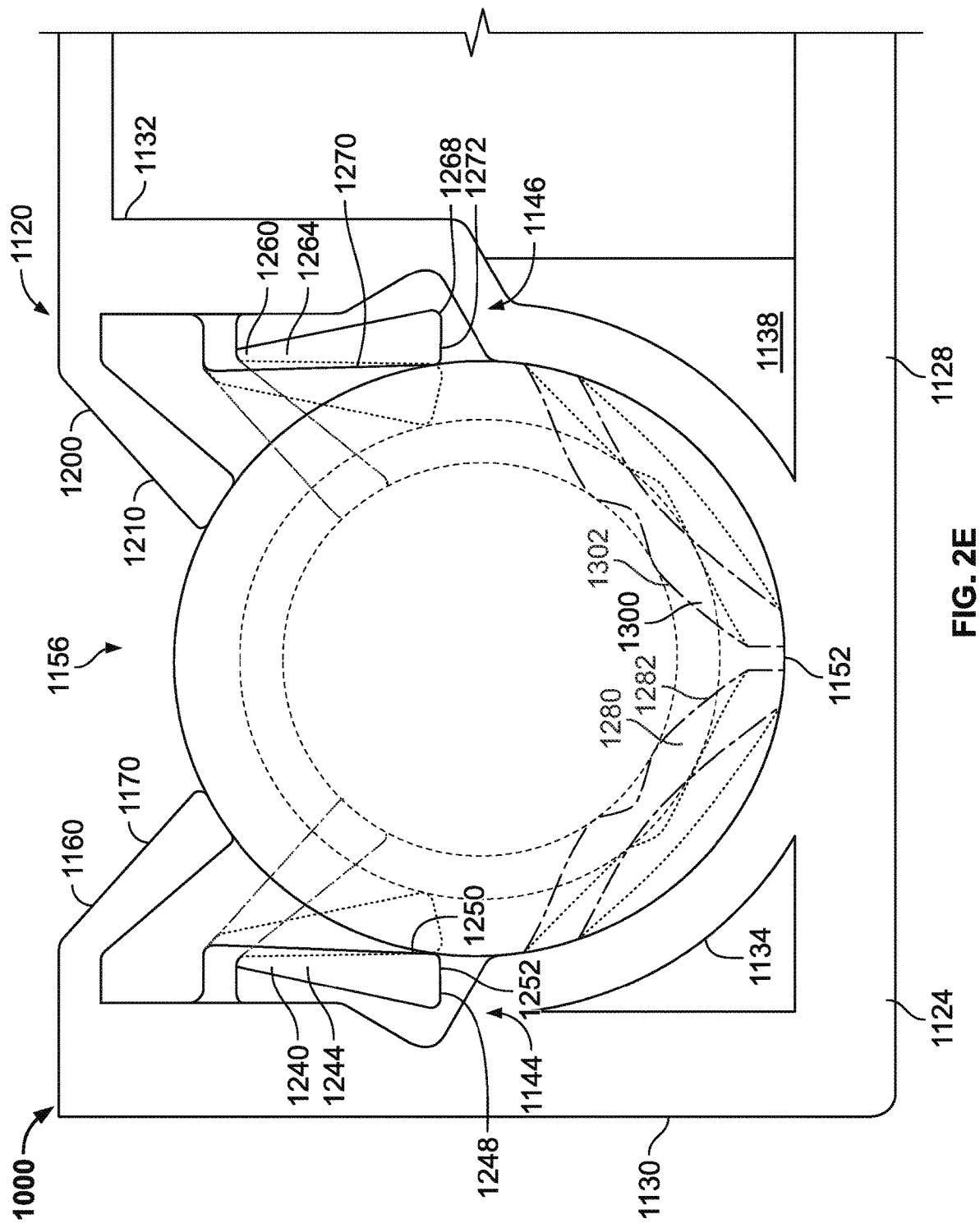
FIG. 2E is a fragmentary front view that depicts arms and legs of the line retainer of FIG. 2A in a set of solid lines when retaining a first-sized line, in a first set of dashed lines when alternatively retaining a second-sized line, and in a second set of dashed lines when alternatively retaining a third-sized line.

As best shown in FIG. 2B, the first arm 1160 includes: (1) a first segment 1162 that extends inwardly from the first side wall 1130, and (2) a second segment 1164 that extends from the first segment 1162. The second segment 1164 includes: (1) a proximal end 1166 that is connected to the first segment 1162, (2) a distal end 1168 opposite the proximal end 1166, (3) a line-contact surface 1170 that extends between the proximal end 1166 and the distal end 1168, and (4) a line-retention surface 1172 at and/or adjacent to the distal end 1168. The second segment 1164 is angled toward the base wall 1128 of the body 1120 such that the distal end 1168 is the portion of the first arm 1160 that is closest to the base wall 1128. As best shown in FIG. 2E, the first arm 1160 is biased toward a rest position at which the second segment 164 is angled at an obtuse angle toward the base wall 1128 relative to the first segment 1162.

Similarly, as best shown in FIG. 2C, the second arm 1180 includes: (1) a first segment 1182 that extends inwardly from the first side wall 1130, and (2) a second segment 1184 that extends from the first segment 1182. The second segment 1184 includes: (1) a proximal end 1186 that is connected to the first segment 1182, (2) a distal end 1188 opposite the proximal end 1186, (3) a line-contact surface 1190 that extends between the proximal end 1186 and the distal end 1188, and (4) a line-retention surface 1192 at and/or adjacent to the distal end 1188. The second segment 1184 is angled toward the base wall 1128 of the body 1120 such that the distal end 1188 is the portion of the second arm 1180 that is closest to the base wall 1128. The second arm 1180 is biased toward a rest position at which the second segment 1184 is angled at an obtuse angle toward the base wall 1128 relative to the first segment 1182.

Similarly, as best shown in FIG. 2B, the third arm 1200 includes: (1) a first segment 1202 that extends inwardly from the second side wall 1132 and (2) a second segment 1204 that extends from the first segment 1202. The second segment 1204 includes: (1) a proximal end 1206 that is connected to the first segment 1202, (2) a distal end 1208 opposite the proximal end 1206, (3) a line-contact surface 1210 that extends between the proximal end 1206 and the distal end 1208, and (4) a line-retention surface 1212 at and/or adjacent the distal end 1208. The second segment 1204 is angled toward the base wall 1128 of the body 1120 such that the distal end 1208 is the portion of the third arm 1200 that is closest to the base wall 1128. The third arm 1200 is biased toward a rest position at which the second segment 1204 is angled at an obtuse angle toward the base wall 1128 relative to the first segment 1202.

Similarly, as best shown in FIG. 2C, the fourth arm 1220 includes: (1) a first segment 1222 that extends inwardly from the second side wall 1132 and (2) a second segment 1224 that extends from the first segment 1222. The second segment 1224 includes: (1) a proximal end 1226 that is connected to the first segment 1222, (2) a distal end 1228 opposite the proximal end 1226, (3) a line-contact surface 1230 that extends between the proximal end 1226 and the distal end 1228, and (4) a line-retention surface 1232 at and/or adjacent to the distal end 1228. The second segment 1224 is angled toward the base wall 1128 of the body 1120 such that the distal end 1228 is the portion of the fourth arm 1220 that is closest to the base wall 1128. The fourth arm 1220 is biased toward a rest position at which the second segment 1224 is angled at an obtuse angle toward the base wall 1128 relative to the first segment 1222.

As best shown in FIG. 2B, the second set of opposing arms 1240 and 1260 includes: (1) a fifth arm 1240 that extends from the first side wall 1130 of the body 1120, and (2) a sixth arm 1260 that extends from the second side wall 1132 opposite the fifth arm 1240. The fifth arm 1240 extends from the first side wall 1130 between (1) the first and second arms 1160 and 1180 and (2) the base wall 1128. More specifically, the fifth arm 1240 extends from the first side wall 1130 between (1) the first and second arms 1160 and 1180, and (2) the first indentation 1144 defined by the first side wall 1130. Similarly, the sixth arm 1260 extends from the second side wall 1132 between (1) the third and fourth arms 1200 and 1220 and (2) the base wall 1128. More specifically, the sixth arm 1260 extends from the second side wall 1132 between (1) the third and fourth arms 1200 and 1220, and (2) the second indentation 1146 defined by the second side wall 1132. Each of the second set of opposing arms 1240 and 1260 is also offset from and located centrally between the front end 1124 and the rear end 1126 of the body 1120.

As best shown in FIG. 2B, the fifth arm 1240 includes: (1) a first segment 1242 that extends inwardly from the first side wall 1130, and (2) a second segment 1244 that extends from the first segment 1242. The second segment 1244 includes: (1) a proximal end 1246 that is connected to the first segment 1242, (2) a distal end 1248 opposite the proximal end 1246, (3) a line-contact surface 1250 that extends between the proximal end 1246 and the distal end 1248, and (4) a line-retention surface 1252 at and/or adjacent to the distal end 1248. The second segment 1244 is angled toward the base wall 1128 of the body 1120 such that the distal end 1248 is the portion of the fifth arm 1240 that is closest to the base wall 1128. As best shown in FIG. 2E, the fifth arm 1240 is biased toward a rest position at which the second segment 1244 is angled at an obtuse angle toward the base wall 1128 relative to the first segment 1242.

Similarly, as best shown in FIG. 2B, the sixth arm 1260 includes: (1) a first segment 1262 that extends inwardly from the second side wall 1132, and (2) a second segment 1264 that extends from the first segment 1262. The second segment 1264 includes: (1) a proximal end 1266 that is connected to the first segment 1262, (2) a distal end 1268 opposite the proximal end 1266, (3) a line-contact surface 1270 that extends between the proximal end 1266 and the distal end 1268, and (4) a line-retention surface 1272 at and/or adjacent to the distal end 1268. The second segment 1264 is angled toward the base wall 1128 of the body 1120 such that the distal end 1268 is the portion of the sixth arm 1260 that is closest to the base wall 1128. The sixth arm 1260 is biased toward a rest position at which the second segment 1264 is angled at an obtuse angle toward the base wall 1128 relative to the first segment 1262.

The set of opposing legs 1280 and 1300 of the illustrated example line retainer 1000 includes: (1) a first leg 1280 that extends from the first side wall 1130 of the body 1120, and (2) a second leg 1300 that extends from the second side wall 1132 opposite the first leg 1280. The first leg 1280 has a convex shape and is offset from and located centrally between the front end 1124 and the rear end 1126 of the body 1120. The first leg 1280 has a line-contact surface 1282 that has a convex shape and is configured to receive and engage a portion of the line. The first leg 1280 includes: (1) a proximal end 1284 extending from the first side wall 1130 and (2) a distal end 1286. The first leg 1280 defines a notch 1288 that is between the proximal end 1284 and the distal end 1286. The notch 1288 facilitates flexing of the distal end 1286 when a larger-sized line contacts the line-contact surface 1282 to enable the first leg 1280 to accommodate the larger-sized line within the line-receiving slot 1122. Similarly, second leg 1300 has a convex shape and is offset from and located centrally between the front end 1124 and the rear end 1126 of the body 1120. The second leg 1300 has a line-contact surface 1302 that has a convex shape and is configured to receive and engage a portion of the line. The second leg 1300 includes: (1) a proximal end 1304 extending from the first side wall 1130 and (2) a distal end 1306. The second leg 1300 defines a notch 1308 that is between the proximal end 1304 and the distal end 1306. The notch 1308 facilitates flexing of the distal end 1306 when a larger-sized line contacts the line-contact surface 1302 to enable the second leg 1300 to accommodate the larger-sized line within the line-receiving slot 1122. In the illustrated example, the distal end 1286 of the first leg 1280 is spaced apart from the distal end 1306 of the second leg 1300. In other examples, the distal ends 1286 and 1306 of the first and second legs 1280 and 1300 are connected together to enable the first and second legs 1280 and 1300 to provide an increased reaction force.

The frame 1110; the body 1120; the first set of opposing arms 1160, 1180, 1200, and 1220; the second set of opposing arms 1240 and 1260; and the set of opposing legs 1280 and 1300 of the illustrated example line retainer 1000 are integrally and specifically monolithically suitably formed (such as via molding) of a semi-rigid material, such as but not limited to nylon, acetyl, and/or other plastic(s) or combinations thereof. The semi-rigid material enables first set of opposing arms 1160, 1180, 1200, and 1220; the second set of opposing arms 1240 and 1260; and the set of opposing legs 1280 and 1300 to flex (1) to enable any one of a plurality of different lines having different outer diameters to be inserted into the line-receiving slot 1122 through the opening 1156 and (2) to accommodate such lines having different outer diameters (such as outer diameters between about 8 millimeters and 12 millimeters). The flexibility of the semi-rigid material and the arrangement of the first set of opposing arms 1160, 1180, 1200, and 1220 and the second set of opposing arms 1240 and 1260 enable any such line to be inserted into the line-receiving slot 1122 with an insertion force that can be easily applied by an assembler. The rigidity of the semi-rigid material and the arrangement of the first set of opposing arms 1160, 1180, 1200, and 1220 and the second set of opposing arms 1240 and 1260 also provide a rigidity that inhibits the line from being removed from the line-receiving slot 1122 through the opening 1156 unless an extraction force that is greater than the insertion force is applied.

As best shown by the set of solid lines in FIG. 2E, the first set of opposing arms 1160, 1180, 1200, and 1220 is configured to engage a first-sized line (such as a line having a 12 millimeter outer diameter) when the first-sized line is positioned within the line-receiving slot 1122 to securely retain the first-sized line within the line-receiving slot 1122. The distal ends 1168, 1188, 1208, and 1228 of the second segments 1164, 1184, 1204, and 1224 of the first set of opposing arms 1160, 1180, 1200, and 1220 are thicker than the respective proximal ends 1166, 1186, 1206, and 1226 to increase the rigidity of the first set of opposing arms 1160, 1180, 1200, and 1220 and, in turn, increase the extraction force required to remove the first-sized line from the line-receiving slot 1122.

As best shown by the set of dashed lines in FIG. 2E, the second set of opposing arms 1240 and 1260 is configured to engage a different second-sized line (such as a line having an 8 millimeter outer diameter) when the second-sized line is positioned within the line-receiving slot 1122 to securely retain the second-sized line within the line-receiving slot 1122. The distal ends 1248 and 1268 of the second segments 1244 and 1264 of the second set of opposing arms 1240 and 1260 are thicker than the respective proximal ends 1246 and 1266 to increase the rigidity of the second set of opposing arms 1240 and 1260 and, in turn, substantially increase the extraction force required to remove the second-sized line from the line-receiving slot 1122.

As best shown by FIG. 2E, each of the line-contact surfaces 1282 and 1302 of the respective set of opposing legs 1280 and 1300 is configured to engage any one of a plurality of differently-sized lines. For example, when the second-sized line is positioned within the line-receiving slot 1122, the line-contact surfaces 1282 and 1302 of the respective set of opposing legs 1280 and 1300 are configured to engage the second-sized line in respective rest positions of the set of opposing legs 1280 and 1300. When the first-sized line is positioned within the line-receiving slot 1122, the line-contact surfaces 1282 and 1302 are configured to engage the first-sized line, and the set of opposing legs 1280 and 1300 are configured to flex at least partially into the gap 158 to accommodate the larger outer diameter of the first-sized line.

The first set of opposing arms 1160, 1180, 1200, and 1220 and the second set of opposing arms 1240 and 1260 are staggered with respect to each other to facilitate retainment of any one of a plurality of differently-sized lines within the line-receiving slot 1122. For example, the staggered arrangement of the first set of opposing arms 1160, 1180, 1200, and 1220 and the second set of opposing arms 1240 and 1260 (1) prevent the second set of opposing arms 1240 and 1260 from impeding the flexing of the first set of opposing arms 1160, 1180, 1200, and 1220 as a line is inserted through the opening 1156 and (2) inhibit the line from sliding out of either end of the line-receiving slot 1122. The set of opposing legs 1280 and 1300 and the first set of opposing arms 1160, 1180, 1200, and 1220 also are staggered with respect to each other to facilitate retainment of any one of a plurality of differently-sized lines within the line-receiving slot 1122.

When a line is inserted through the opening 1156 toward the line-receiving slot 1122, the line-contact surfaces 1170, 1190, 1210, and 1230 of the first set of opposing arms 1160, 1180, 1200, and 1220 engage the line and the second segments 1164, 1184, 1204, and 1224 flex outwardly from their respective rest positions toward the first and second side walls 1130 and 1132. As the line is pushed further into the opening 1156, the line-contact surfaces 1250 and 1270 of the second set of opposing arms 1240 and 1260 engage the line and the second segments 1244 and 1264 flex outwardly from their respective rest positions toward the first and second side walls 1130 and 1132. The distal ends 1248 and 1268 of the second set of opposing arms 1240 and 1260 are configured to pivot at least partially into the first and second indentations 1144 and 1146, respectively, to enable the line to be positioned within the line-receiving slot 1122. The first set of opposing arms 1160, 1180, 1200, and 1220 are configured to snap back and return to their respective rest positions once the line is pushed far enough into the line-receiving slot 1122 to clear the first set of opposing arms 1160, 1180, 1200, and 1220. Similarly, the second set of opposing arms 1240 and 1260 are configured to snap back and return to their respective rest positions once the line is pushed far enough into the line-receiving slot 1122 to clear the second set of opposing arms 1240 and 1260. The line-contact surfaces 1282 and 1302 of the respective set of opposing legs 1280 and 1300 are configured to engage the line once the line is inserted into the line-receiving slot 1122. Additionally, depending on the outer diameter of the line, the set of opposing legs 1280 and 1300 are configured to flex at least partially into the gap 1158, and the front and rear line-contact surfaces 1152 and 1154 of the respective front and rear support walls 1134 and 1136 once the line is inserted into the line-receiving slot 1122.

For example, the solid set of lines of FIG. 2E depict a relatively large-sized line (such as a line having a 12 millimeter outer diameter) retained with the line-receiving slot 1122. When the line is pushed into the line-receiving slot 1122 through the opening 1156 via an insertion force, the line first engages the line-contact surfaces 1170, 1190, 1210, and 1230 of the second segments 1164, 1184, 1204, and 1224 of the first set of opposing arms 1160, 1180, 1200, and 1220 and causes the second segments 1164, 1184, 1204, and 1224 to flex outwardly. The line then engages the line-contact surfaces 1250 and 1270 of the second set of opposing arms 1240 and 1260 and causes the second segments 1244 and 1264 to flex outwardly from their respective rest positions into the first and second indentations 1144 and 1146. Subsequently, the line engages the line-contact surfaces 1282 and 1302 of the set of opposing legs 1280 and 1300 and pushes the set of opposing legs 1280 and 1300 to flex at least partially into the gap 1158. The line reaches a retained position within the line-receiving slot 1122 once the line engages and rests on the front and rear line-contact surfaces 1152 and 1154 of the respective front and rear support walls 1134 and 1136. Once the line is pushed into the retained position, the distal ends 1168, 1188, 1208, and 1228 of the first set of opposing arms 1160, 1180, 1200, and 1220 snap back and return to their respective rest positions to deter the line from being removed through the opening 1156. As best shown in FIG. 2E, the line-contact surfaces 1282 and 1302 of the set of opposing legs 1280 and 1300; the line-contact surfaces 1250 and 1270 of the second set of opposing arms 1240 and 1260; and/or the line-retention surfaces 1172, 1192, 1212, and 1232 of the first set of opposing arms 1160, 1180, 1200, and 1220 engage the line in the retained position to secure the line within the line-receiving slot 1122.

A first dashed set of lines of FIG. 2E depict a relatively small-sized line (such as a line having an 8 millimeter outer diameter) retained with the line-receiving slot 1122. When the line is pushed into the line-receiving slot 1122 through the opening 1156, the line first engages the line-contact surfaces 1170, 1190, 1210, and 1230 of the second segments 1164, 1184, 1204, and 1224 of the first set of opposing arms 1160, 1180, 1200, and 1220 and causes the second segments 1164, 1184, 1204, and 1224 to flex outwardly. The line then engages the line-contact surfaces 1250 and 1270 of the second set of opposing arms 1240 and 1260 and causes the second segments 1244 and 1264 to flex outwardly from their respective rest positions toward the first and second indentations 1144 and 1146. The distal ends 1168, 1188, 1208, and 1228 of the first set of opposing arms 1160, 1180, 1200, and 1220 subsequently snap back to their respective rest positions as the line continues to be pushed into the line-receiving slot 1122 and disengages from the first set of opposing arms 1160, 1180, 1200, and 1220. Once the line is pushed into a retained position within the line-receiving slot 1122, the distal ends 1248 and 1268 of the second set of opposing arms 1240 and 1260 snap back to their respective rest positions to deter the line from being removed through the opening 1156. Additionally, the line engages and rests on the line-contact surfaces 1282 and 1302 of the set of opposing legs 1280 and 1300, which remain in a retained position upon receiving the line. When the line is in the retained position within the line-receiving slot 1122, the line-retention surfaces 1252 and 1272 of the second set of opposing arms 1240 and 1260 and the line-contact surfaces 1282 and 1302 of the set of opposing legs 1280 and 1300 engage the line to securely retain the line within the line-receiving slot 1122.

A second dashed set of lines of FIG. 2E depict an intermediate-sized line (such as a line having a 10 millimeter outer diameter) retained with the line-receiving slot 1122. When the intermediate-sized line is pushed into the line-receiving slot 1122 through the opening 1156, the line first engages the line-contact surfaces 1170, 1190, 1210, and 1230 of the second segments 1164, 1184, 1204, and 1224 of the first set of opposing arms 1160, 1180, 1200, and 1220 and causes the second segments 1164, 1184, 1204, and 1224 to flex outwardly. The line then engages the line-contact surfaces 1250 and 1270 of the second set of opposing arms 1240 and 1260 and causes the second segments 1244 and 1264 to flex outwardly from their respective rest positions toward the first and second indentations 1144 and 1146. Subsequently, the line engages the line-contact surfaces 1282 and 1302 of the set of opposing legs 1280 and 1300 and pushes the set of opposing legs 1280 and 1300 to flex to an intermediate position at least partially within the gap 1158. The distal ends 1168, 1188, 1208, and 1228 of the first set of opposing arms 1160, 1180, 1200, and 1220 then snap back to their respective rest positions as the line continues to be pushed into the line-receiving slot 1122 and disengages from the first set of opposing arms 1160, 1180, 1200, and 1220. When the line is pushed into a retained position within the line-receiving slot 1122, the second set of opposing arms 1240 and 1260 are in an intermediate position between the first and second indentations 1144 and 1146 and their respective rest positions. In the intermediate position, the line-contact surfaces 1250 and 1270 of the second set of opposing arms 1240 and 1260 remain engaged with the line to secure the line within the line-receiving slot 1122. When the line is in the retained position within the line-receiving slot 1122, (1) the second segments 1244 and 1264 of the respective second set of opposing arms 1240 and 1260 and (2) the line-contact surfaces 1282 and 1302 of the set of opposing legs 1280 and 1300 engage the line to secure the line within the line-receiving slot 1122.

Figure 3A:
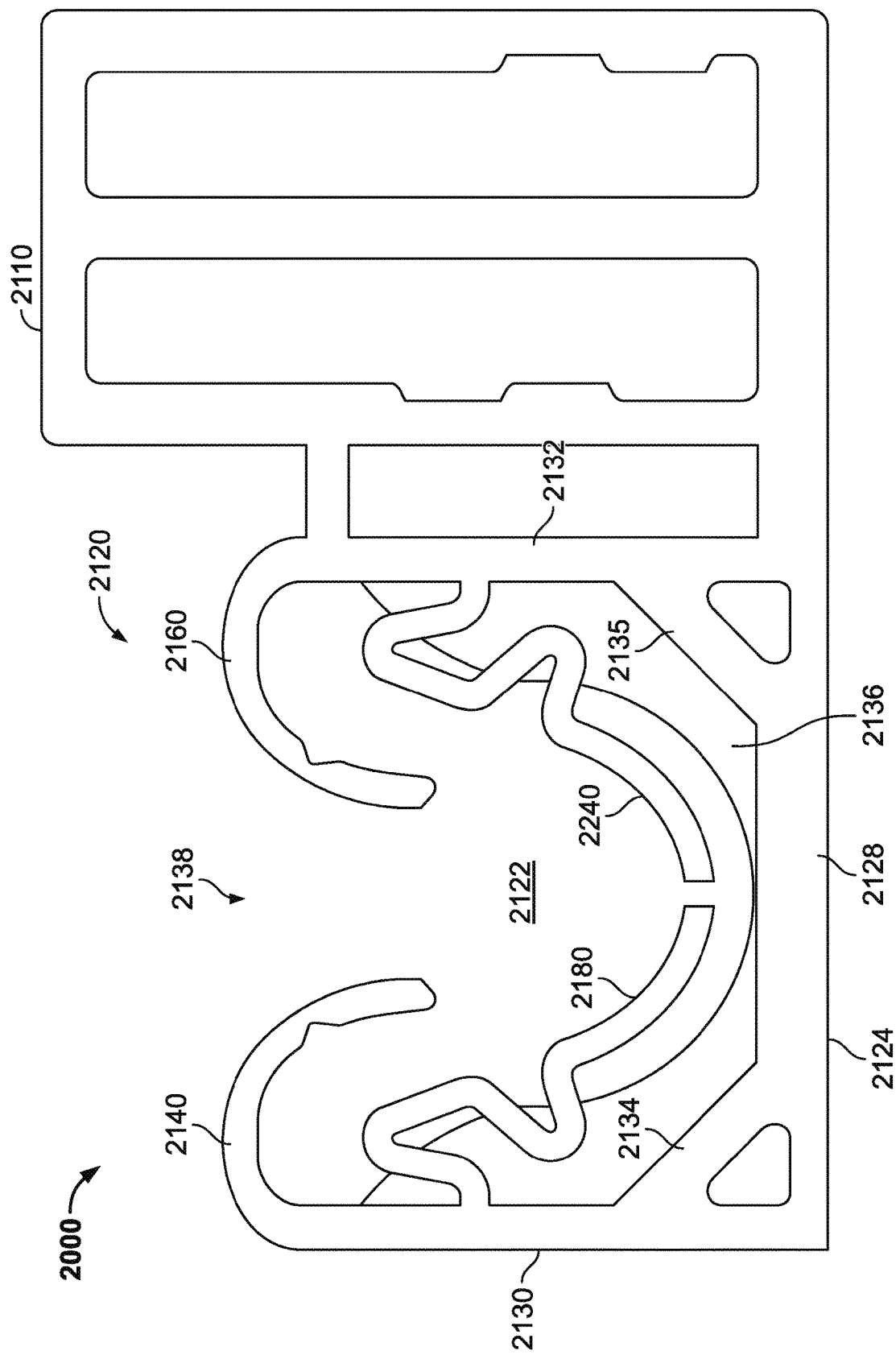
FIG. 3A is a front view of an example line retainer of another embodiment of the present disclosure.

FIGS. 3A, 3B, 3C, and 3D illustrate another example embodiment of a line retainer of the present disclosure that is generally indicated by numeral 2000. As best shown in FIG. 3A, the illustrated example line retainer 2000 includes: (1) a frame 2110 configured to connect onto a section of a vehicle, and (2) a body 2120 defining a line-receiving slot 2122 that is configured to receive and retain any one of a plurality of different lines having different outer diameters. The frame 2110 includes any suitable connection mechanism(s) to attach the line retainer 2000 to a section of the vehicle. The body 2120 extends from and is integrally and specifically monolithically suitably formed (such as via molding) formed with the frame 2110 of the line retainer 2000. In this illustrated example embodiment, the body 2120 defines one slot to enable the line retainer 2000 to retain one line at a time. It should be appreciated that the body can alternatively define multiple line-receiving slots that are arranged next to each other or that are spaced apart to enable the line retainer of the present disclosure to simultaneously retain multiple lines.

The body 2120 of the illustrated example line retainer 2000 includes: (1) a front end 2124, (2) a rear end 2126 opposite the front end 2124, (3) a base wall 2128, (4) a first side wall 2130 connected to the base wall 2128 and extending between the front end 2124 and the rear end 2126, (5) a second side wall 2132 connected to the base wall 2128 and extending between the front end 2124 and the rear end 2126 opposite and spaced apart from the first side wall 2130, (6) a first truss 2134 connected to and extending between the base wall 2128 and the first side wall 2130, (7) a second truss 2135 connected to and extending between the base wall 2128 and the first side wall 2130 opposite the first truss 2134, and (8) a support wall 2136 connected to and extending transversely along the base wall 2128, the first side wall 2130, and the second side wall 2132 between the front end 2124 and the rear end 2126.

Figure 3B:
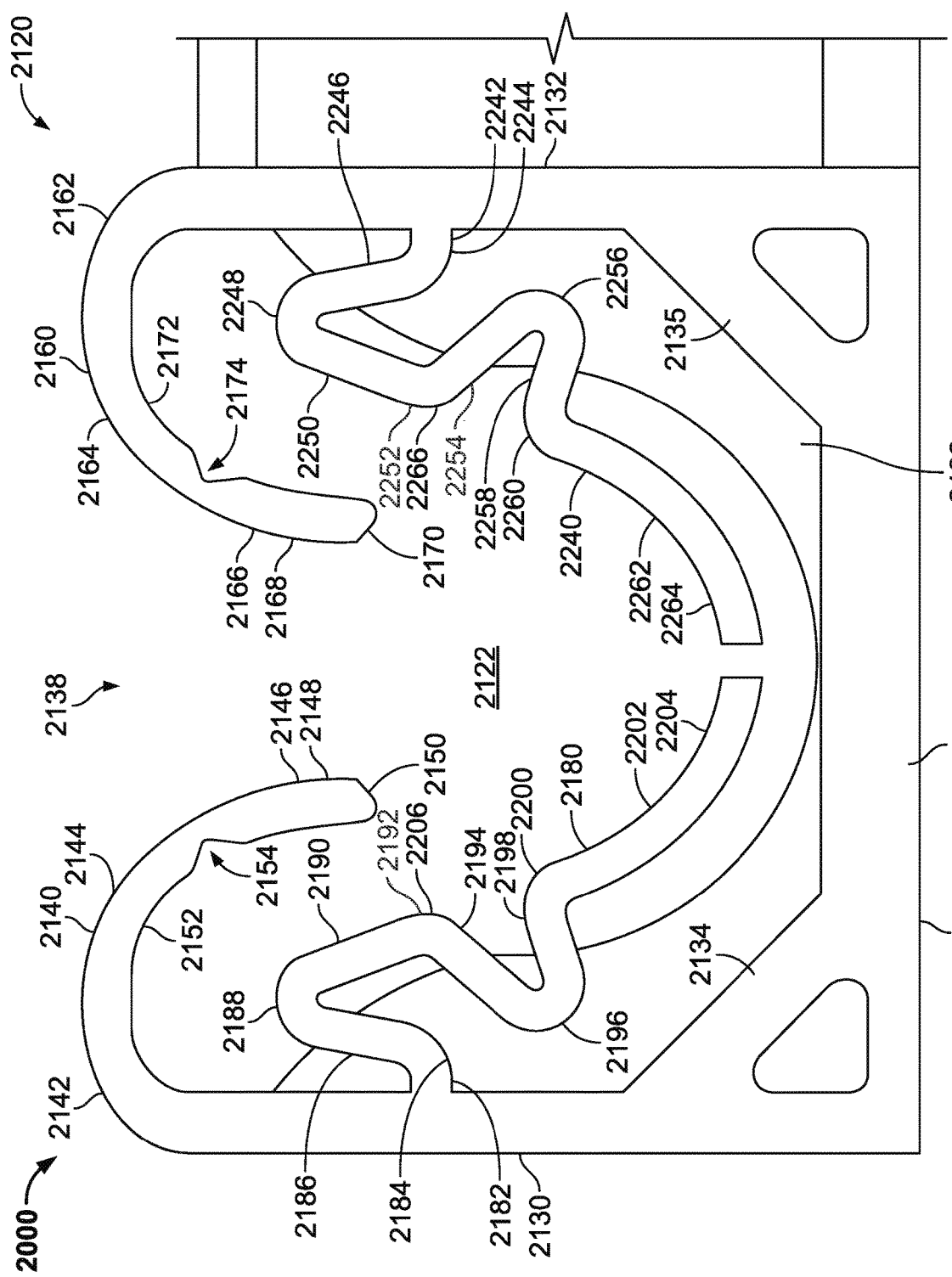
FIG. 3B is a fragmentary front view of a portion of the line retainer of FIG. 3A.
Figure 3C:
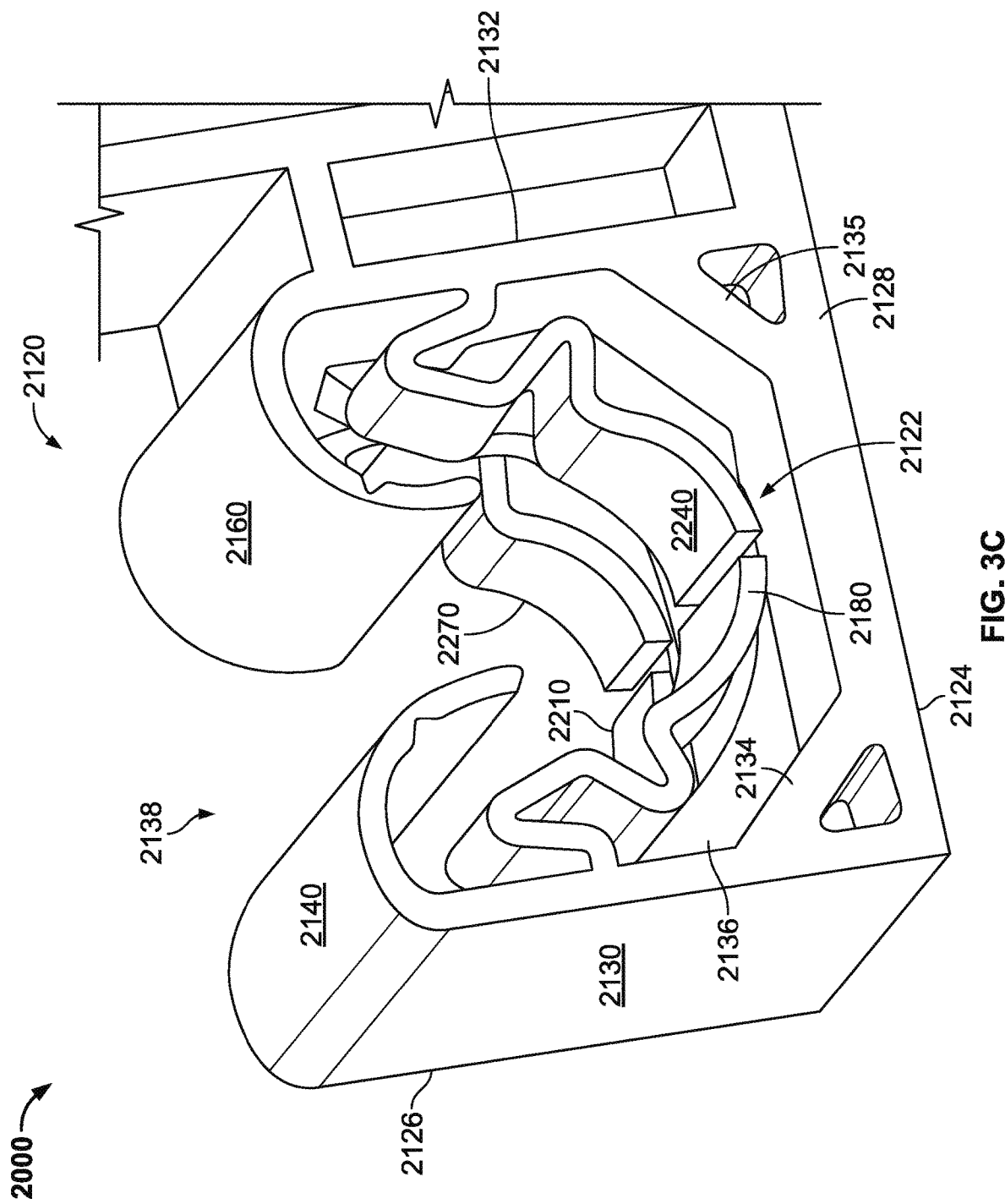
FIG. 3C is a fragmentary perspective view of the portion of the line retainer of FIG. 3A.

As best shown in FIG. 3C, the first and second side walls 2130 and 2132 each extend between the front end 2124 and the rear end 2126 to define a depth of the body 2120 of the line retainer 2000. The base wall 2128 and the first and second side walls 2130 and 2132 define the line-receiving slot 2122 configured to receive any one of a plurality of different lines having different outer diameters and in which such line is configured to be securely retained. The first and second side walls 2130 and 2132 also define an opening 2138 of the line-receiving slot 2122 that is opposite the base wall 2128 such that any of such different lines can be inserted into the line-receiving slot 2122 through the opening 2138.

The illustrated example line retainer 2000 also includes: (1) a set of opposing arms 2140 and 2160 extending into the line-receiving slot 2122 respectively from the first and second side walls 2130 and 2132 adjacent the opening 2138, and (2) a set of opposing legs 2180, 2210, 2240, and 2270 extending into the line-receiving slot 2122 respectively from the first and second side walls 2130 and 2132 between the opening 2138 and the base wall 2128.

The set of opposing arms 2140 and 2160 includes: (1) a first arm 2140 that extends from the first side wall 2130 between the front end 2124 and the rear end 2126 of the body 1120, and (2) a second arm 2160 that extends from the second side wall 2132 between the front end 2124 and the rear end 2126 of the body 1120.

As best shown in FIG. 3B, the first arm 2140 includes: (1) a proximal segment 2142 that extends from the first side wall 2130 in a direction at least partially away from the base wall 2128 and inwardly toward the second side wall 2132, (2) an intermediate segment 2144 that extends from the proximal segment 2142 in a direction at least partially toward the base wall 2128 and inwardly toward the second side wall 2132, (3) a distal segment 2146 that extends into the line-receiving slot 2122 from the intermediate segment 2144 in a direction at least partially toward the base wall 2128 and inwardly toward the second side wall 2132, (4) a line-contact surface 2148 defined by the intermediate and distal segments 2144 and 2146, (5) a retention-line surface 2150 defined by the distal segment 2146, and (6) an interior surface 2152 defined by the proximal, intermediate, and distal segments 2142, 2144, and 2146 opposite the line-contact surface 2148. The line-contact surface 2148 has a convex surface, and the interior surface 2152 has a concave surface. The first arm 2140 defines a notch 2154 along the interior surface 2152 between the intermediate and distal segments 2144 and 2146 to facilitate flexing of the distal segment 2146 toward the first side wall 2130.

Similarly, the second arm 2160 includes: (1) a proximal segment 2162 that extends from the second side wall 2132 in a direction at least partially away from the base wall 2128 and inwardly toward the first side wall 2130, (2) an intermediate segment 2164 that extends from the proximal segment 2162 in a direction at least partially toward the base wall 2128 and inwardly toward the first side wall 2130, (3) a distal segment 2166 that extends into the line-receiving slot 2122 from the intermediate segment 2166 in a direction at least partially toward the base wall 2128 and inwardly toward the first side wall 2130, (4) a line-contact surface 2168 defined by the intermediate and distal segments 2164 and 2166, (5) a retention-line surface 2170 defined by the distal segment 2166, and (6) an interior surface 2172 defined by the proximal, intermediate, and distal segments 2162, 2164, and 2166 opposite the line-contact surface 2168. The line-contact surface 2168 has a convex surface, and the interior surface 2172 has a concave surface. The second arm 2160 defines a notch 2174 along the interior surface 2172 between the intermediate and distal segments 2164 and 2166 to facilitate flexing of the distal segment 2166 toward the second side wall 2132.

As best shown in FIG. 3C, the set of opposing legs 2180, 2210, 2240, and 2270 includes: (1) a first leg 2180 that extends from the first side wall 2130 adjacent the front end 2124 of the body 2120, (2) a second leg 2210 that extends from the first side wall 2130 adjacent the rear end 2126 of the body 2120, (3) a third leg 2240 that extends from the second side wall 2132 adjacent the front end 2124 and opposite the first leg 2180, and (4) a fourth leg 2270 that extends from the second side wall 2132 adjacent the rear end 2126 and opposite the second leg 2210. The second leg 2210 is longitudinally aligned with and spaced apart from the first leg 2180. The fourth leg 2270 is longitudinally aligned with and spaced apart from the third leg 2240.

As best shown in FIG. 3B, the first leg 2180 includes: (1) a proximal segment 2182 that extends from the first side wall 2130 inwardly into the line-receiving slot 2122, (2) a first bend 2184 extending from the proximal segment 2182 and having an obtuse angle, (3) a first intermediate segment 2186 extending from the first bend 2184 toward the opening 2138 at an obtuse angle relative to the proximal segment 2182, (4) a second bend 2188 extending from the first intermediate segment 2186 and having an acute angle, (5) a second intermediate segment 2190 extending from the second bend 2188 toward the base wall 2128 at an acute angle relative to the first intermediate segment 2186, (6) a third bend 2192 extending from the second intermediate segment 2190 and having an obtuse angle, (7) a third intermediate segment 2194 extending from the third bend 2192 toward the first side wall 2130 at an obtuse angle relative to the second intermediate segment 2190, (8) a fourth bend 2196 extending from the third intermediate segment 2194 and having an acute angle, (9) a fourth intermediate segment 2198 extending from the fourth bend 2196 toward the second side wall 2132 at an acute angle relative to the third intermediate segment 2194, (10) a fifth bend 2200 extending from the fourth intermediate segment 2198 and having an obtuse angle, and (11) a distal segment 2202 extending from the fifth bend 2200 toward the base wall 2128 and the second side wall 2132 at an obtuse angle relative to the fourth intermediate segment 2198. The distal segment 2202 defines a first line-contact surface 2204 that is configured to receive any one of a plurality of differently-sized lines. The second intermediate segment 2190, the third bend 2192, and/or the third intermediate segment 2194 define a second line-contact surface 2206 that is configured to contact some of the differently-sized lines.

The second leg 2210 is similar to the first leg 2180, except for its location with respect to the first side wall 2130 and the line-receiving slot 2122. Since the second leg 2210 is similar to the first leg 2180, only certain aspects of the second leg 2210 are described in this section for brevity. The features, functions, and alternatives described regarding the first leg 2180 thus also apply to the second leg 2210.

As best shown in FIG. 3B, the third leg 2240 includes: (1) a proximal segment 2242 that extends from the second side wall 2132 inwardly into the line-receiving slot 2122, (2) a first bend 2244 extending from the proximal segment 2242 and having an obtuse angle, (3) a first intermediate segment 2246 extending from the first bend 2244 toward the opening 2138 at an obtuse angle relative to the proximal segment 2242, (4) a second bend 2248 extending from the first intermediate segment 2246 and having an acute angle, (5) a second intermediate segment 2250 extending from the second bend 2248 toward the base wall 2128 at an acute angle relative to the first intermediate segment 2246, (6) a third bend 2252 extending from the second intermediate segment 2250 and having an obtuse angle, (7) a third intermediate segment 2254 extending from the third bend 2252 toward the second side wall 2132 at an obtuse angle relative to the second intermediate segment 2250, (8) a fourth bend 2256 extending from the third intermediate segment 2254 and having an acute angle, (9) a fourth intermediate segment 2258 extending from the fourth bend 2256 toward the first side wall 2130 at an acute angle relative to the third intermediate segment 2254, (10) a fifth bend 2260 extending from the fourth intermediate segment 2258 and having an obtuse angle, and (11) a distal segment 2262 extending from the fifth bend 2260 toward the base wall 2128 and the first side wall 2130 at an obtuse angle relative to the fourth intermediate segment 2258. The distal segment 2262 defines a first line-contact surface 2264 that is configured to receive any one of a plurality of differently-sized lines. The second intermediate segment 2250, the third bend 2252, and/or the third intermediate segment 2254 define a second line-contact surface 2266 that is configured to contact some of the differently-sized lines.

The fourth leg 2270 is similar to the third leg 2240, except for its location with respect to the second side wall 2132 and the line-receiving slot 2122. Since the fourth leg 2270 is similar to the third leg 2240, only certain aspects of the fourth leg 2270 are described in this section for brevity. The features, functions, and alternatives described regarding the third leg 2240 thus also apply to the fourth leg 2270.

The frame 2110; the body 2120; the set of opposing arms 2140 and 2160; and the set of opposing legs 2180, 2210, 2240, and 2270 of the illustrated example line retainer 2000 are integrally and specifically monolithically suitably formed (such as via molding) of a semi-rigid material, such as but not limited to nylon, acetyl, and/or other plastic(s) or combinations thereof. The semi-rigid material enables the set of opposing arms 2140 and 2160 and the set of opposing legs 2180, 2210, 2240, and 2270 to flex (1) to enable any one of a plurality of different lines having different outer diameters to be inserted into the line-receiving slot 2122 through the opening 2138 and (2) to accommodate such lines having different outer diameters (such as outer diameters between about 8 millimeters and 12 millimeters). The flexibility of the semi-rigid material and the arrangement of the set of opposing arms 2140 and 2160 and the set of opposing legs 2180, 2210, 2240, and 2270 enable any such line to be inserted into the line-receiving slot 2122 with an insertion force that can be easily applied by an assembler. The rigidity of the semi-rigid material and the arrangement of the set of opposing arms 2140 and 2160 and the set of opposing legs 2180, 2210, 2240, and 2270 also provide a rigidity that inhibits the line from being removed from the line-receiving slot 2122 through the opening 2138 unless an extraction force that is greater than the insertion force is applied.

When a line is inserted through the opening 2138 toward the line-receiving slot 2122, the line-contact surfaces 2148 and 2168 of the set of opposing arms 2140 and 2160 engage the line and the distal segments 2146 and 2166 and/or the intermediate segments 2144 and 2164 flex outwardly from their respective rest positions toward the first and second side walls 2130 and 2132. As the line is pushed further into the opening 2138, the distal segments 2146 and 2166 and/or the intermediate segments 2144 and 2164 begin to flex back toward their respective rest positions while the line-contact surfaces 2148 and 2168 continue to engage the line. Additionally, the first line-contact surfaces 2204 and 2264 of the set of opposing legs 2180 and 2240, and the respective first line-contact surfaces of 2210 and 2270, engage the line. Depending on the outer diameter of the line, (1) the set of opposing arms 2140 and 2160 remain in a partially flexed position and the line-contact surfaces 2148 and 2168 remain in contact with the line or (2) the set of opposing arms 2140 and 2160 return to their respective rest positions and the retention-line surfaces 2150 and 2170 engage the line to secure the line in a retained position within the line-receiving slot 2122. Additionally, depending on the outer diameter of the line, (1) the set of opposing legs 2180, 2210, 2240, and 2270 are configured to flex and/or (2) the second line-contact surfaces 2206 and 2266 are configured to engage the line to secure the line in a retained position within the line-receiving slot 2122.

Figure 3D:
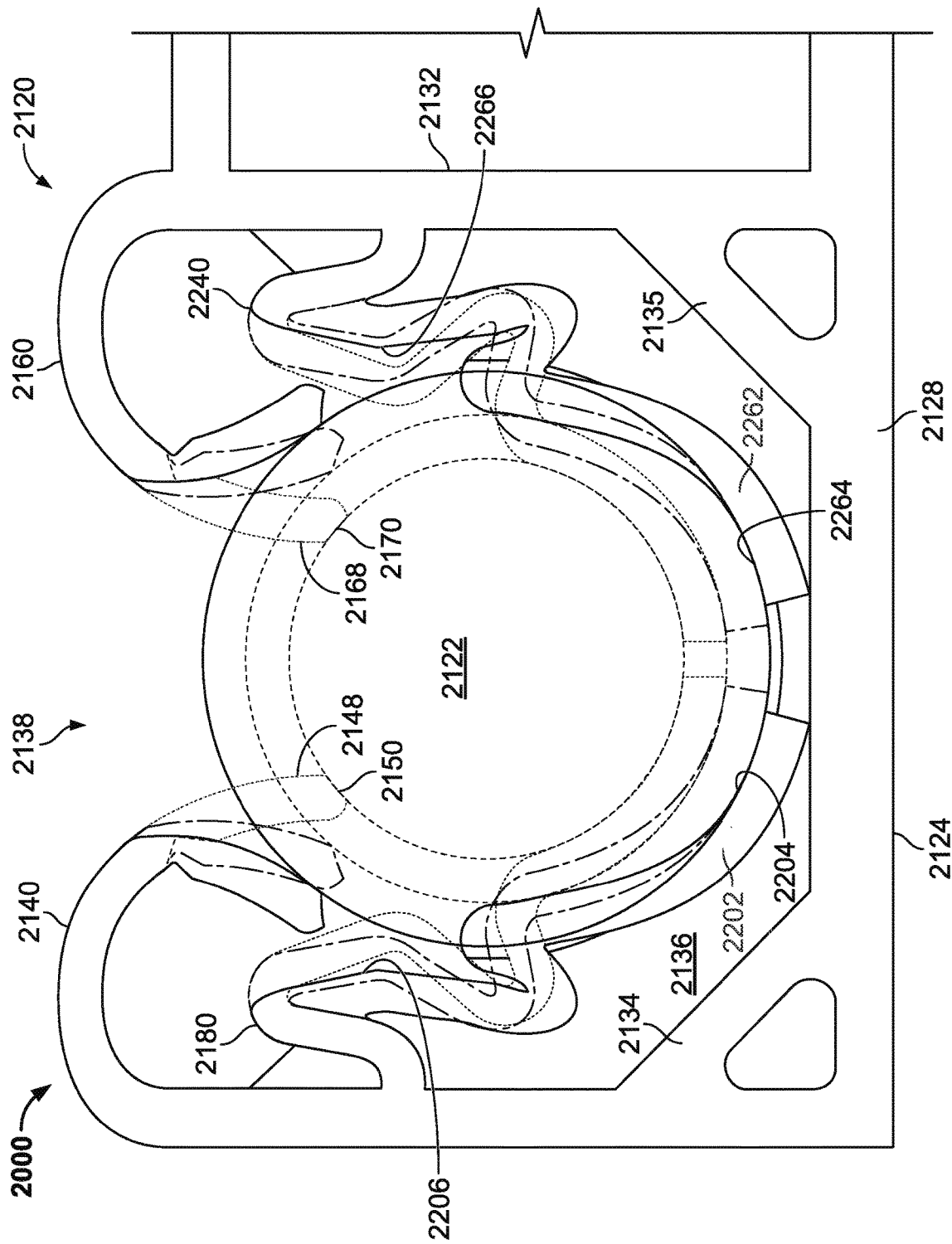
FIG. 3D is a fragmentary front view that depicts arms and legs of the line retainer of FIG. 3A in a set of solid lines when retaining a first-sized line, in a first set of dashed lines when alternatively retaining a second-sized line, and in a second set of dashed lines when alternatively retaining a third-sized line.

For example, the solid set of lines of FIG. 3D depict a relatively large-sized line (such as a line having a 12 millimeter outer diameter) retained with the line-receiving slot 2122. When the line is pushed into the line-receiving slot 2122 through the opening 2138 via an insertion force, the line first engages the line-contact surfaces 2148 and 2168 of the set of opposing arms 2140 and 2160 and causes the distal segments 2146 and 2166 and/or the intermediate segments 2144 and 2164 to flex outwardly. As the line is pushed further into the opening 2138, the distal segments 2146 and 2166 and/or the intermediate segments 2144 and 2164 begin to flex back toward their respective rest positions while the line-contact surfaces 2148 and 2168 continue to engage the line. The second line-contact surfaces 2206 and 2266 of the set of opposing legs 2180, 2210, 2240, and 2270 contact the line. Additionally, the line engages the first line-contact surfaces 2204 and 2264 of the set of opposing legs 2180, 2210, 2240, and 2270 and causes the set of opposing legs 2180, 2210, 2240, and 2270 to flex. When the line is in the retained position within the line-receiving slot 2122, the line-contact surfaces 2148 and 2168 of the set of opposing arms 2140 and 2160; the first line-contact surfaces 2204 and 2264 of the set of opposing legs 2180, 2210, 2240, and 2270; and the second line-contact surfaces 2206 and 2266 of the set of opposing legs 2180, 2210, 2240, and 2270 engage the line to secure the line within the line-receiving slot 2122.

A first dashed set of lines of FIG. 3D depict a relatively small-sized line (such as a line having an 8 millimeter outer diameter) retained within the line-receiving slot 2122. When the line is pushed into the line-receiving slot 2122 through the opening 2138 via an insertion force, the line first engages the line-contact surfaces 2148 and 2168 of the set of opposing arms 2140 and 2160 and causes the distal segments 2146 and 2166 and/or the intermediate segments 2144 and 2164 to flex outwardly. As the line is pushed further into the opening 2138, the distal segments 2146 and 2166 and/or the intermediate segments 2144 and 2164 begin to flex back toward their respective rest positions while the line-contact surfaces 2148 and 2168 continue to engage the line. The line reaches a retained position within the line-receiving slot 2122 once the line engages and rests on the first line-contact surfaces 2204 and 2264 of the set of opposing legs 2180 and 2240, and the respective first line-contact surfaces of 2210 and 2270. Once the line is pushed into the retained position, the set of opposing arms 2140 and 2160 return to their respective rest positions and the retention-line surfaces 2150 and 2170 engage the line to deter the line from being removed through the opening 2138. As best shown in FIG. 3D, the retention-line surfaces 2150 of 2170 of the set of opposing arms 2140 and 2160 and the first line-contact surfaces 2204 and 2264 of the set of opposing legs 2180 and 2240, and the respective first line-contact surfaces of 2210 and 2270, engage the line in the retained position to secure the line within the line-receiving slot 2122.

A second dashed set of lines of FIG. 3D depict an intermediate-sized line (such as a line having a 10 millimeter outer diameter) retained with the line-receiving slot 2122. When the line is pushed into the line-receiving slot 2122 through the opening 2138 via an insertion force, the line first engages the line-contact surfaces 2148 and 2168 of the set of opposing arms 2140 and 2160 and causes the distal segments 2146 and 2166 and/or the intermediate segments 2144 and 2164 to flex outwardly. As the line is pushed further into the opening 2138, the distal segments 2146 and 2166 and/or the intermediate segments 2144 and 2164 begin to flex back toward their respective rest positions while the line-contact surfaces 2148 and 2168 continue to engage the line. Additionally, the line engages the first line-contact surfaces 2204 and 2264 of the set of opposing legs 2180 and 2240, and the respective first line-contact surfaces of 2210 and 2270, and causes the set of opposing legs 2180, 2210, 2240, and 2270 to flex. When the line is in the retained position within the line-receiving slot 2122, the line-contact surfaces 2148 and 2168 of the set of opposing arms 2140 and 2160 and the first line-contact surfaces 2204 and 2264 of the set of opposing legs 2180 and 2240, and the respective first line-contact surfaces of 2210 and 2270, engage the line to secure the line within the line-receiving slot 2122.

Figure 4A:
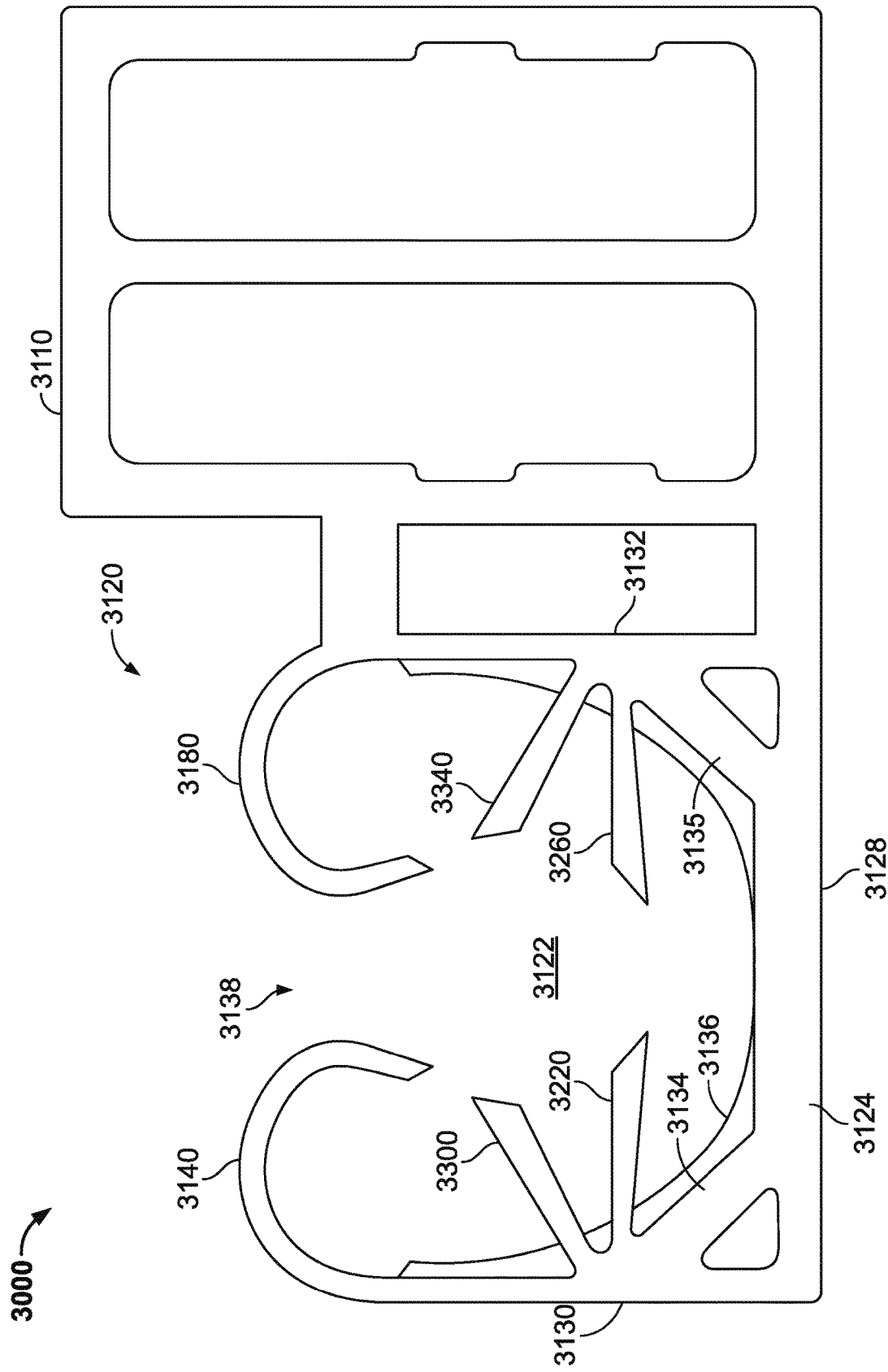
FIG. 4A is a front view of an example line retainer of another embodiment of the present disclosure.

FIGS. 4A, 4B, 4C, and 4D illustrate another example embodiment of a line retainer of the present disclosure that is generally indicated by numeral 3000. As best shown in FIG. 4A, the illustrated example line retainer 3000 includes: (1) a frame 3110 configured to connect onto a section of a vehicle, and (2) a body 3120 defining a line-receiving slot 3122 that is configured to receive and retain any one of a plurality of different lines having different outer diameters. The frame 3110 includes any suitable connection mechanism(s) to attach the line retainer 3000 to a section of the vehicle. The body 3120 extends from and is integrally and specifically monolithically suitably formed (such as via molding) formed with the frame 3110 of the line retainer 3000. In this illustrated example embodiment, the body 3120 defines one slot to enable the line retainer 3000 to retain one line at a time. It should be appreciated that the body can alternatively define multiple line-receiving slots that are arranged next to each other or that are spaced apart to enable the line retainer of the present disclosure to simultaneously retain multiple lines.

The body 3120 of the illustrated example line retainer 3000 includes: (1) a front end 3124, (2) a rear end 3126 opposite the front end 3124, (3) a base wall 3128, (4) a first side wall 3130 connected to the base wall 3128 and extending between the front end 3124 and the rear end 3126, (5) a second side wall 3132 connected to the base wall 3128 and extending between the front end 3124 and the rear end 3126 opposite and spaced apart from the first side wall 3130, (6) a first truss 3134 connected to and extending between the base wall 3128 and the first side wall 3130, (7) a second truss 3135 connected to and extending between the base wall 3128 and the first side wall 3130 opposite the first truss 3134, and (8) a support wall 3136 connected to and extending transversely along the base wall 3128, the first side wall 3130, and the second side wall 3132 between the front end 3124 and the rear end 3126.

Figure 4B:
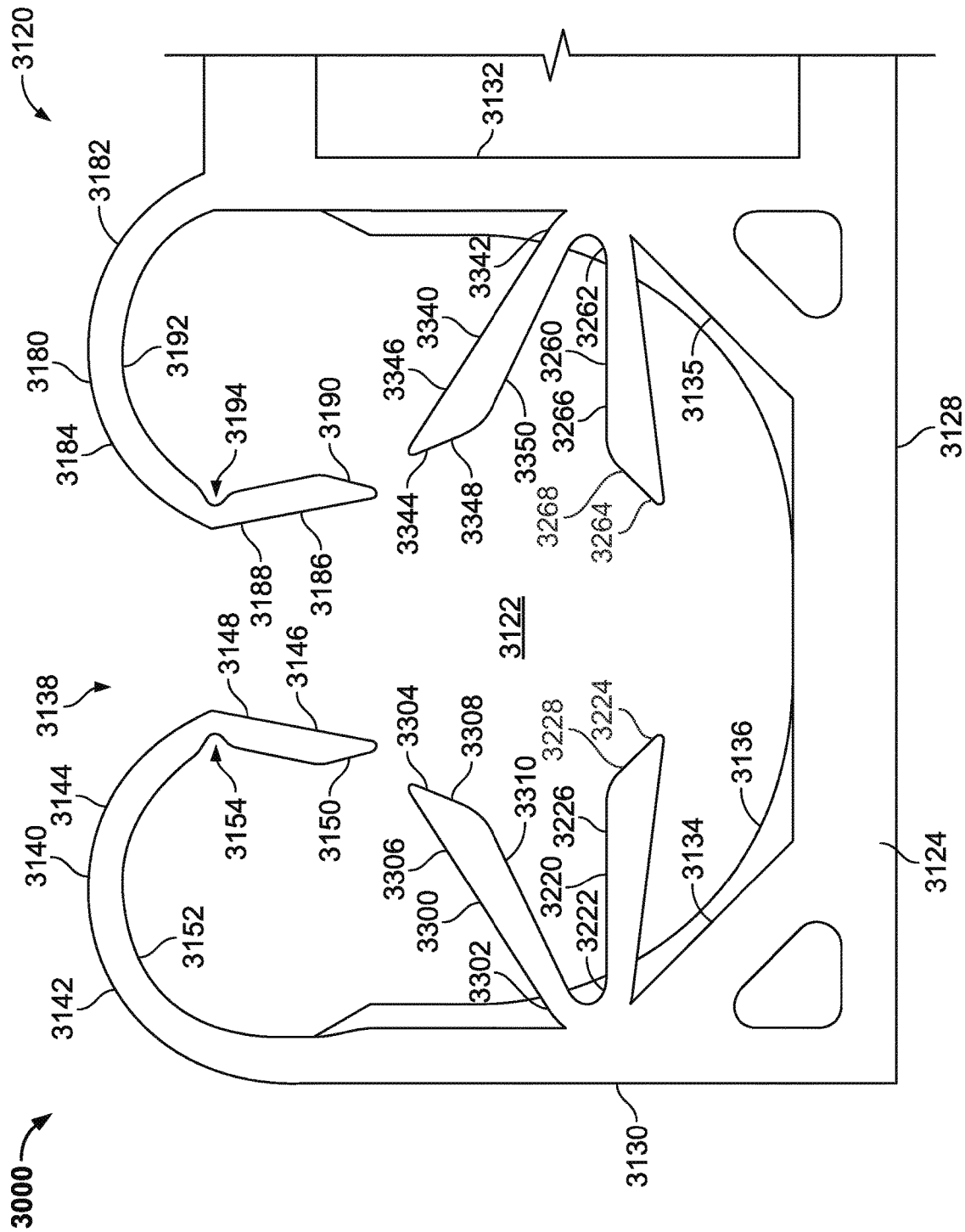
FIG. 4B is a fragmentary front view of a portion of the line retainer of FIG. 4A.
Figure 4C:
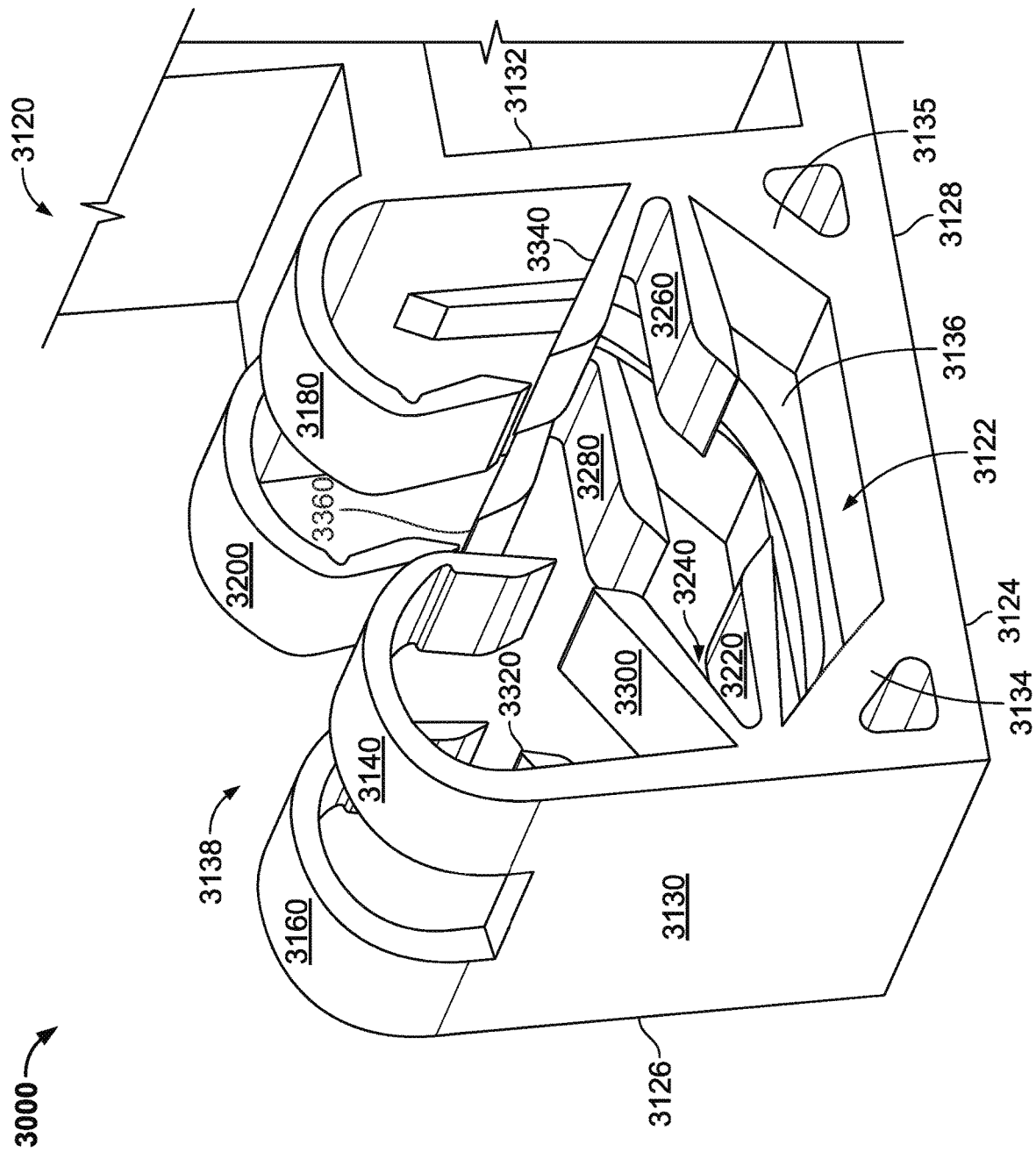
FIG. 4C is a fragmentary perspective view of the portion of the line retainer of FIG. 4A.

As best shown in FIG. 4C, the first and second side walls 3130 and 3132 each extend between the front end 3124 and the rear end 3126 to define a depth of the body 3120 of the line retainer 3000. The base wall 3128 and the first and second side walls 3130 and 3132 define the line-receiving slot 3122 configured to receive any one of a plurality of different lines having different outer diameters and in which such line is configured to be securely retained. The first and second side walls 3130 and 3132 also define an opening 3138 of the line-receiving slot 3122 that is opposite the base wall 3128 such that any of such different lines can be inserted into the line-receiving slot 3122 through the opening 3138.

The illustrated example line retainer 3000 also includes: (1) a set of opposing arms 3140, 3160, 3180, and 3200 extending into the line-receiving slot 3122 respectively from the first and second side walls 3130 and 3132 adjacent the opening 3138, (2) a first set of opposing legs 3220, 3240, 3260, and 3280 extending into the line-receiving slot 3122 respectively from the first and second side walls 3130 and 3132 between the opening 3138 and the base wall 3128, and (3) a second set of opposing legs 3300, 3320, 3340, and 3360 extending into the line-receiving slot 3122 respectively from the first and second side walls 3130 and 3132 between the set of opposing arms 3140, 3160, 3180, and 3200 and the first set of opposing legs 3220, 3240, 3260, and 3280.

The set of opposing arms 3140, 3160, 3180, and 3200 includes: (1) a first arm 3140 that extends from the first side wall 3130 adjacent the front end 3124 of the body 3120, (2) a second arm 3160 that extends from the first side wall 3130 adjacent the rear end 3126 of the body 3120, (3) a third arm 3180 that extends from the second side wall 3132 adjacent the front end 3124 of the body 3120, and (4) a fourth arm 3200 that extends from the second side wall 3132 adjacent the rear end 3126 of the body 3120. The second arm 3160 is longitudinally aligned with and spaced apart from the first arm 3140. The fourth arm 3200 is longitudinally aligned with and spaced apart from the third arm 3180.

As best shown in FIG. 4B, the first arm 3140 includes: (1) a proximal segment 3142 that extends from the first side wall 3130 in a direction at least partially away from the base wall 3128 and inwardly toward the second side wall 3132, (2) an intermediate segment 3144 that extends from the proximal segment 3142 in a direction at least partially toward the base wall 3128 and inwardly toward the second side wall 3132, (3) a distal segment 3146 that extends into the line-receiving slot 3122 from the intermediate segment 3146 in a direction at least partially toward the base wall 3128 and inwardly toward the second side wall 3132, (4) a line-contact surface 3148 defined by the intermediate and distal segments 3144 and 3146, (5) a retention-line surface 3150 defined by the distal segment 3146, and (6) an interior surface 3152 defined by the proximal, intermediate, and distal segments 3142, 3144, and 3146 opposite the line-contact surface 3148. The line-contact surface 3148 has a convex surface, and the interior surface 3152 has a concave surface. The first arm 3140 defines a notch 3154 along the interior surface 3152 between the intermediate and distal segments 3144 and 3146 to facilitate flexing of the distal segment 3146 toward the first side wall 3130.

The second arm 3160 is similar to the first arm 3140, except for its location with respect to the first side wall 3130 and the line-receiving slot 3122. Since the second arm 3160 is similar to the first arm 3140, only certain aspects of the second arm 3160 are described in this section for brevity. The features, functions, and alternatives described regarding the first arm 3140 thus also apply to the second arm 3160.

As best shown in FIG. 4B, the third arm 3180 includes: (1) a proximal segment 3182 that extends from the second side wall 3132 in a direction at least partially away from the base wall 3128 and inwardly toward the first side wall 3130, (2) an intermediate segment 3184 that extends from the proximal segment 3182 in a direction at least partially toward the base wall 3128 and inwardly toward the first side wall 3130, (3) a distal segment 3186 that extends into the line-receiving slot 3122 from the intermediate segment 3184 in a direction at least partially toward the base wall 3128 and inwardly toward the first side wall 3130, (4) a line-contact surface 3188 defined by the intermediate and distal segments 3184 and 3186, (5) a retention-line surface 3190 defined by the distal segment 3186, and (6) an interior surface 3192 defined by the proximal, intermediate, and distal segments 3182, 3184, and 3186 opposite the line-contact surface 3188. The line-contact surface 3188 has a convex surface, and the interior surface 3192 has a concave surface. The third arm 3180 defines a notch 3194 along the interior surface 3192 between the intermediate and distal segments 3184 and 3186 to facilitate flexing of the distal segment 3186 toward the second side wall 3132.

The fourth arm 3200 is similar to the third arm 3180, except for its location with respect to the second side wall 3132 and the line-receiving slot 3122. Since the fourth arm 3200 is similar to the third arm 3180, only certain aspects of the fourth arm 3200 are described in this section for brevity. The features, functions, and alternatives described regarding the third arm 3180 thus also apply to the fourth arm 3200.

As best shown in FIG. 4C, the first set of opposing legs 3220, 3240, 3260, and 3280 includes: (1) a first leg 3220 that extends from the first side wall 3130 adjacent the front end 3124 of the body 3120, (2) a second leg 3240 that extends from the first side wall 3130 adjacent the rear end 3126 of the body 3120, (3) a third leg 3260 that extends from the second side wall 3132 adjacent the front end 3124 and opposite the first leg 3220, and (4) a fourth leg 3280 that extends from the second side wall 3132 adjacent the rear end 3126 and opposite the second leg 3240. The second leg 3240 is longitudinally aligned with and spaced apart from the first leg 3220. The fourth leg 3280 is longitudinally aligned with and spaced apart from the third leg 3260.

As best shown in FIG. 4B, the first leg 3220 extends from the first side wall 3130 inwardly into the line-receiving slot 3122 and at least partially toward the base wall 3128. The first leg 3220 includes: (1) a proximal end 3222 connected to and extending from the first side wall 3130, (2) a distal end 3224 opposite the proximal end 3222, (3) a line-contact surface 3226 extending adjacent the distal end 3224 on a side at least partially facing the opening 3138, and (4) a line-retention surface 3228 at the distal end 3224. An obtuse angle is formed between the line-contact surface 3226 and the line-retention surface 3228.

The second leg 3240 is similar to the first leg 3220, except for its location with respect to the first side wall 3130 and the line-receiving slot 3122. Since the second leg 3240 is similar to the first leg 3220, only certain aspects of the second leg 3240 are described in this section for brevity. The features, functions, and alternatives described regarding the first leg 3220 thus also apply to the second leg 3240.

As best shown in FIG. 4B, the third leg 3260 extends from the second side wall 3132 inwardly into the line-receiving slot 3122 and at least partially toward the base wall 3128 of the line-receiving slot 3122. The third leg 3260 includes: (1) a proximal end 3262 connected to and extending from the second side wall 3132, (2) a distal end 3264 opposite the proximal end 3262, (3) a line-contact surface 3266 extending adjacent the distal end 3264 on a side at least partially facing the opening 3138, and (4) a line-retention surface 3268 at the distal end 3264. An obtuse angle is formed between the line-contact surface 3266 and the line-retention surface 3268.

The fourth leg 3280 is similar to the third leg 3260, except for its location with respect to the second side wall 3132 and the line-receiving slot 3122. Since the fourth leg 3280 is similar to the third leg 3260, only certain aspects of the fourth leg 3280 are described in this section for brevity. The features, functions, and alternatives described regarding the third leg 3260 thus also apply to the fourth leg 3280.

The second set of opposing legs 3300, 3320, 3340, and 3360 includes: (1) a fifth leg 3300 that extends from the first side wall 3130 adjacent the front end 3124 of the body 3120, (2) a sixth leg 3320 that extends from the first side wall 3130 adjacent the rear end 3126 of the body 3120, (3) a seventh leg 3340 that extends from the second side wall 3132 adjacent the front end 3124 and opposite the first leg 3220, and (4) an eighth leg 3360 that extends from the second side wall 3132 adjacent the rear end 3126 and opposite the second leg 3240. The sixth leg 3320 is longitudinally aligned with and spaced apart from the fifth leg 3300. The eighth leg 3360 is longitudinally aligned with and spaced apart from the seventh leg 3340.

The fifth leg 3300 extends from the first side wall 3130 inwardly into the line-receiving slot 3122 and at least partially toward the opening 3138 of the line-receiving slot 3122. The fifth leg 3300 and the first leg 3220 are adjacent to each other and arranged to form a "<" shape. The fifth leg 3300 and the first leg 3220 are arranged to form a sideways v-shape, in which the first leg 3220 extends at least partially toward the base wall 3128 and the fifth leg 3300 extends partially toward the opening 3138. The fifth leg 3300 includes: (1) a proximal end 3302 connected to and extending from the first side wall 3130, (2) a distal end 3304 opposite the proximal end 3302, (3) a line-contact surface 3306 extending adjacent the distal end 3304 on a side at least partially facing the opening 3138, (4) a first line-retention surface 3308 at the distal end 3304, and (5) a second line-retention surface 3310 adjacent the distal end 3304 on a side at least partially facing the base wall 3128. An acute angle is formed between the line-contact surface 3306 and the first line-retention surface 3308. An obtuse angle is formed between the first line-retention surface 3308 and the second line-retention surface 3310.

The sixth leg 3320 is similar to the fifth leg 3300, except for its location with respect to the first side wall 3130 and the line-receiving slot 3122. Since the sixth leg 3320 is similar to the fifth leg 3300, only certain aspects of the sixth leg 3320 are described in this section for brevity. The features, functions, and alternatives described regarding the fifth leg 3300 thus also apply to the sixth leg 3320.

The seventh leg 3340 extends from the second side wall 3132 inwardly into the line-receiving slot 3122 and at least partially toward the opening 3138 of the line-receiving slot 3122. The seventh leg 3340 and the third leg 3260 are arranged to form a sideways v-shape, in which the third leg 3260 extends at least partially toward the base wall 3128 and the seventh leg 3340 extends partially toward the opening

3138. As best shown in FIG. 4B, the seventh leg 3340 includes: (1) a proximal end 3342 connected to and extending from the second side wall 3132, (2) a distal end 3344 opposite the proximal end 3342, (3) a line-contact surface 3346 extending adjacent the distal end 3344 on a side at least partially facing the opening 3138, (4) a first line-retention surface 3348 at the distal end 3344, and (5) a second line-retention surface 3350 adjacent the distal end 3344 on a side at least partially facing the base wall 3128. An acute angle is formed between the line-contact surface 3346 and the first line-retention surface 3348. An obtuse angle is formed between the first line-retention surface 3348 and the second line-retention surface 3350.

The eighth leg 3360 is similar to the seventh leg 3340, except for its location with respect to the second side wall 3132 and the line-receiving slot 3122. Since the eighth leg 3360 is similar to the seventh leg 3340, only certain aspects of the eighth leg 3360 are described in this section for brevity. The features, functions, and alternatives described regarding the seventh leg 3340 thus also apply to the eighth leg 3360.

The frame 3110; the body 3120; the set of opposing arms 3140, 3160, 3180, and 3200; the first set of opposing legs 3220, 3240, 3260, and 3280; and the second set of opposing legs 3300, 3320, 3340, and 3360 of the illustrated example line retainer 3000 are integrally and specifically monolithically suitably formed (such as via molding) of a semi-rigid material, such as but not limited to nylon, acetyl, and/or other plastic(s) or combinations thereof. The semi-rigid material enables the set of opposing arms 3140, 3160, 3180, and 3200; the first set of opposing legs 3220, 3240, 3260, and 3280; and the second set of opposing legs 3300, 3320, 3340, and 3360 to flex (1) to enable any one of a plurality of different lines having different outer diameters to be inserted into the line-receiving slot 3122 through the opening 3138 and (2) to accommodate such lines having different outer diameters (such as outer diameters between about 8 millimeters and 12 millimeters). The flexibility of the semi-rigid material and the arrangement of the set of opposing arms 3140, 3160, 3180, and 3200; the first set of opposing legs 3220, 3240, 3260, and 3280; and the second set of opposing legs 3300, 3320, 3340, and 3360 enable any such line to be inserted into the line-receiving slot 3122 with an insertion force that can be easily applied by an assembler. The rigidity of the semi-rigid material and the arrangement of the set of opposing arms 3140, 3160, 3180, and 3200 and the second set of opposing legs 3300, 3320, 3340, and 3360 also provide a rigidity that inhibits the line from being removed from the line-receiving slot 3122 through the opening 3138 unless an extraction force that is greater than the insertion force is applied.

When a line is inserted through the opening 3138 toward the line-receiving slot 3122, the line-contact surfaces 3148 and 3188 of the set of opposing arms 3140, 3160, 3180, 3200 engage the line and the distal segments 3146 and 3186 and/or the intermediate segments 3144 and 3184 flex outwardly from respective rest positions toward the first and second side walls 3130 and 3132. As the line is pushed further into the opening 3138, the distal segments 3146 and 3186 and/or the intermediate segments 3144 and 3184 begin to flex back toward their respective rest positions while the line-contact surfaces 3148 and 3188 continue to engage the line. The line also engages the line-contact surfaces 3306 and 3346 of the second set of opposing legs 3300, 3320, 3340, and 3360 and pushes the second set of opposing legs 3300, 3320, 3340, and 3360 toward the base wall 3128. As the line continues to be pushed further into the opening 3138, the second set of opposing legs 3300, 3320, 3340, and 3360 snap back toward the opening 3138 and the first line-retention surfaces 3308 and 3348 and/or the second line-retention surfaces 3310 and 3350 engage the line. Additionally, the line engages the line-contact surfaces 3226 and 3266 and/or the line-retention surfaces 3228 and 3268 of the first set of opposing legs 3220, 3240, 3260, and 3280. Depending on the outer diameter of the line, (1) the set of opposing arms 3140, 3160, 3180, and 3200 remain in a partially flexed position and the line-contact surfaces 3148 and 3168 remain in contact with the line or (2) the set of opposing arms 3140, 3160, 3180, and 3200 return to their respective rest positions and the retention-line surfaces 3150 and 3170 engage the line to secure the line in a retained position within the line-receiving slot 3122. Additionally, depending on the outer diameter of the line, (1) the first set of opposing legs 3220, 3240, 3260, and 3280 and the second set of opposing legs 3300, 3320, 3340, and 3360 are configured to flex, (2) the line-retention surfaces 3228 and 3268 of the first set of opposing legs 3220, 3240, 3260, and 3280 and the first line-retention surfaces 3308 and 3348 of the second set of opposing legs 3300, 3320, 3340, and 3360 are configured to engage the line, and/or (3) the line-contact surfaces 3226 and 3266 of the first set of opposing legs 3220, 3240, 3260, and 3280 and the second line-retention surfaces 3310 and 3350 of the second set of opposing legs 3300, 3320, 3340, and 3360 are configured to engage the line to secure the line in a retained position within the line-receiving slot 3122.

Figure 4D:
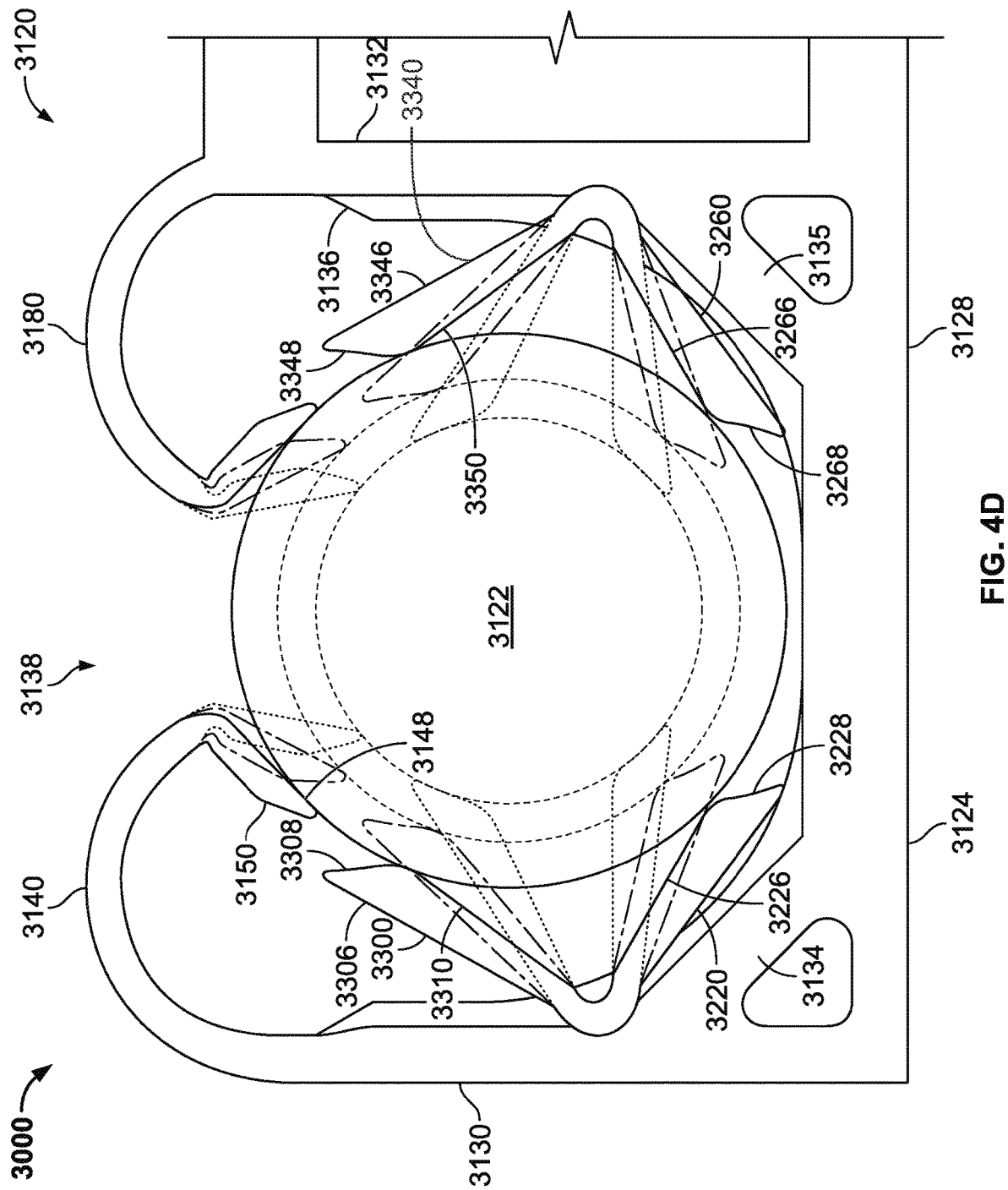
FIG. 4D is a fragmentary front view that depicts arms and legs of the line retainer of FIG. 4A in a set of solid lines when retaining a first-sized line, in a first set of dashed lines when alternatively retaining a second-sized line, and in a second set of dashed lines when alternatively retaining a third-sized line.

For example, the solid set of lines of FIG. 4D depict a relatively large-sized line (such as a line having a 12 millimeter outer diameter) retained with the line-receiving slot 3122. When the line is pushed into the line-receiving slot 3122 through the opening 3138 via an insertion force, the line first engages the line-contact surfaces 3148 and 3188 of the set of opposing arms 3140 and 3180, and the respective line-contact surfaces of 3160 and 3200, and causes the distal segments 3146 and 3186 and/or the intermediate segments 3144 and 3184 to flex outwardly. As the line is pushed further into the opening 3138, the distal segments 3146 and 3186 and/or the intermediate segments 3144 and 3184 begin to flex back toward their respective rest positions while the line-contact surfaces 3148 and 3188 continue to engage the line. The line also engages the line-contact surfaces 3306 and 3346 of the second set of opposing legs 3300 and 3340, and the respective line-contact surfaces of 3320 and 3360, and pushes the second set of opposing legs 3300, 3320, 3340, and 3360 toward the base wall 3128. As the line continues to be pushed further into the opening 3138, (1) the second set of opposing legs 3300, 3320, 3340, and 3360 snap back and are pushed further toward the opening 3138 and (2) the first line-retention surfaces 3308 and 3348 and/or the second line-retention surfaces 3310 and 3350 engage the line. Additionally, the line (1) engages the line-contact surfaces 3226 and 3266 and/or the line-retention surfaces 3228 and 3268 of the first set of opposing legs 3220 and 3260, and the respective line-contact and line-retention surfaces of 3240 and 3280, and (2) flexes the first set of opposing legs 3220, 3240, 3260, and 3280 toward the base wall 3128. The first set of opposing legs 3220, 3240, 3260, and 3280 and the second set of opposing legs 3300, 3320, 3340, and 3360 remain flexed when the line reaches a retained position within the line-receiving slot 3122. To secure the line in the retained position, the line-contact surfaces 3148 and 3188 of the set of opposing arms 3140 and 3180, and the respective line-contact surfaces of 3160 and 3200; the line-contact surfaces 3226 and 3266 of the first set of opposing legs 3220 and 3260, and the respective line-contact surfaces of 3240 and 3280; and the second line-retention surfaces 3310 and 3350 of the second set of opposing legs 3300 and 3340, and the respective second line-retention surfaces of 3320 and 3360, are configured to engage the line.

A first dashed set of lines of FIG. 4D depict a relatively small-sized line (such as a line having an 8 millimeter outer diameter) retained with the line-receiving slot 3122. When the line is pushed into the line-receiving slot 3122 through the opening 3138 via an insertion force, the line first engages the line-contact surfaces 3148 and 3188 of the set of opposing arms 3140 and 3180, and the respective line-contact surfaces of 3160 and 3200, and causes the distal segments 3146 and 3186 and/or the intermediate segments 3144 and 3184 to flex outwardly. As the line is pushed further into the opening 3138, the distal segments 3146 and 3186 and/or the intermediate segments 3144 and 3184 begin to flex back toward their respective rest positions while the line-contact surfaces 3148 and 3188 continue to engage the line. The line also engages the line-contact surfaces 3306 and 3346 of the second set of opposing legs 3300 and 3340, and the respective line-contact surfaces of 3320 and 3360, and pushes the second set of opposing legs 3300, 3320, 3340, and 3360 toward the base wall 3128. As the line continues to be pushed further into the opening 3138, the second set of opposing legs 3300, 3320, 3340, and 3360 snap back toward their respective rest positions. When the line reaches a retained position within the line-receiving slot 3122, (1) the line-retention surfaces 3228 and 3268 of the first set of opposing legs 3220 and 3260, and the respective line-retention surfaces of 3240 and 3280, receive the line, (2) the set of opposing arms 3140, 3160, 3180, and 3200 snap back and return to their respective rest positions, and (3) the second set of opposing legs 3300, 3320, 3340, and 3360 snap back and return to their respective rest positions. The line-contact surfaces 3148 and 3188 of the set of opposing arms 3140 and 3180, and the respective line-contact surfaces of 3160 and 3200; the line-retention surfaces 3228 and 3268 of the first set of opposing legs 3220 and 3260, and the respective line-retention surfaces of 3240 and 3280; and the first line-retention surfaces 3308 and 3348 of the second set of opposing legs 3300 and 3340, and the respective first line-retention surfaces of 3320 and 3360, engage the line in the retained position to secure the line within the line-receiving slot 3122.

A second dashed set of lines of FIG. 4D depict an intermediate-sized line (such as a line having a 10 millimeter outer diameter) retained with the line-receiving slot 3122. When the line is pushed into the line-receiving slot 3122 through the opening 3138 via an insertion force, the line first engages the line-contact surfaces 3148 and 3188 of the set of opposing arms 3140 and 3180, and the respective line-contact surfaces of 3160 and 3200, and causes the distal segments 3146 and 3186 and/or the intermediate segments 3144 and 3184 to flex outwardly. As the line is pushed further into the opening 3138, the distal segments 3146 and 3186 and/or the intermediate segments 3144 and 3184 begin to flex back toward their respective rest positions while the line-contact surfaces 3148 and 3188 continue to engage the line. The line also engages the line-contact surfaces 3306 and 3346 of the second set of opposing legs 3300 and 3340, and the respective line-contact surfaces of 3320 and 3360, and pushes the second set of opposing legs 3300, 3320, 3340, and 3360 toward the base wall 3128. As the line continues to be pushed further into the opening 3138, (1) the second set of opposing legs 3300, 3320, 3340, and 3360 snap back and are pushed further toward the opening 3138 and (2) the first line-retention surfaces 3308 and 3348 and/or the second line-retention surfaces 3310 and 3350 engage the line. Additionally, the line (1) engages the line-contact surfaces 3226 and 3266 and/or the line-retention surfaces 3228 and 3268 of the first set of opposing legs 3220 and 3260, and the respective line-contact and line-retention surfaces of 3240 and 3280, and (2) flexes the first set of opposing legs 3220, 3240, 3260, and 3280 toward the base wall 3128. The first set of opposing legs 3220, 3240, 3260, and 3280 and the second set of opposing legs 3300, 3320, 3340, and 3360 remain flexed when the line reaches a retained position within the line-receiving slot 3122. To secure the line in the retained position, the line-contact surfaces 3148 and 3188 of the set of opposing arms 3140 and 3180, and the respective line-contact surfaces of 3160 and 3200; the line-retention surfaces 3228 and 3268 and/or the line-contact surfaces 3226 and 3266 of the first set of opposing legs 3220 and 3260, and the respective line-retention and line-contact surfaces of 3240 and 3280; and the first line-retention surfaces 3308 and 3348 and/or the second line-retention surfaces 3310 and 3350 of the second set of opposing legs 3300 and 3340, and the respective first line-retention and second line-retention surfaces of 3320 and 3360, are configured to engage the line.

Figure 5A:
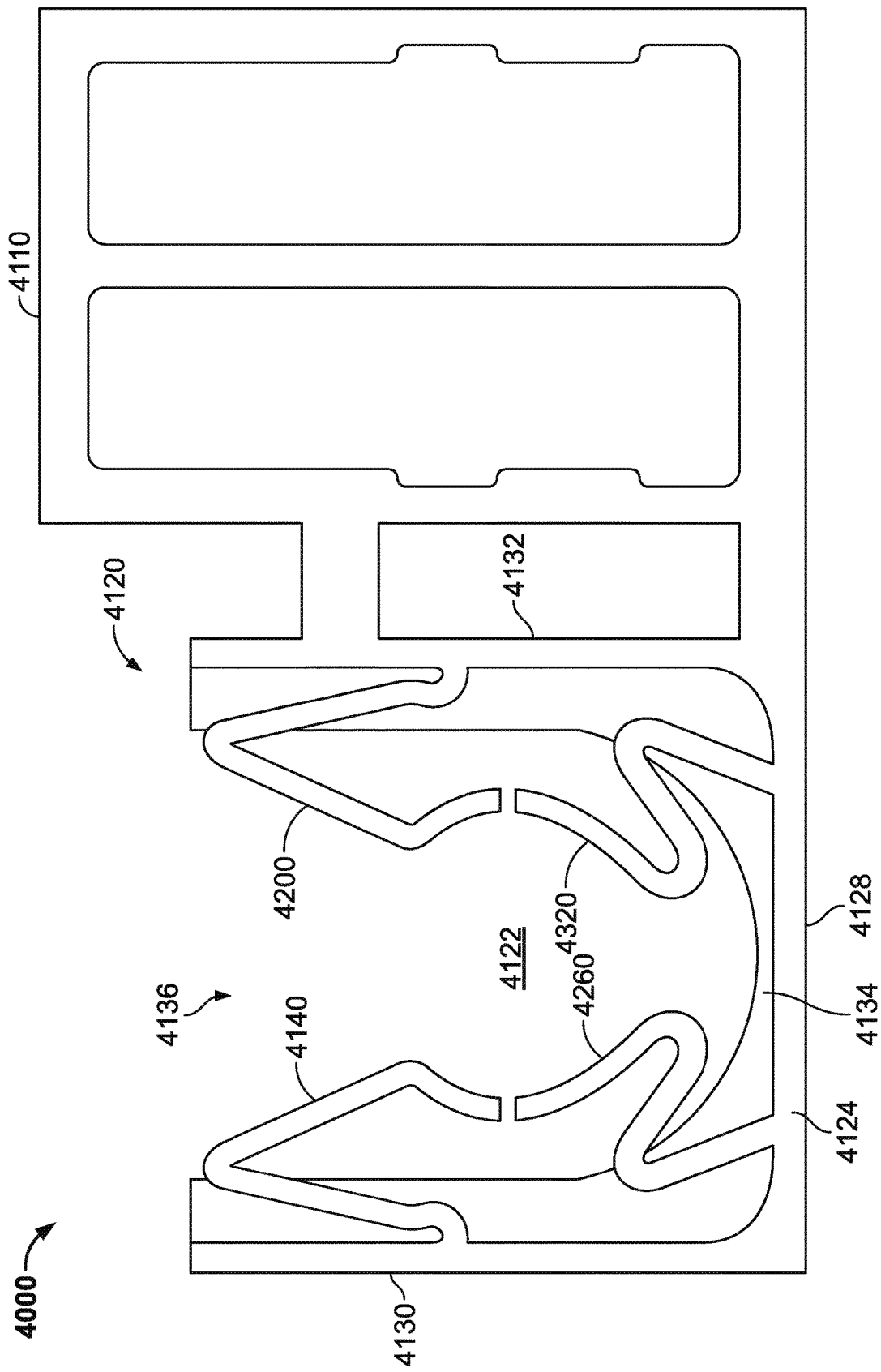
FIG. 5A is a front view of an example line retainer of another embodiment of the present disclosure.

FIGS. 5A, 5B, 5C, and 5D illustrate another example embodiment of a line retainer of the present disclosure that is generally indicated by numeral 4000. As best shown in FIG. 5A, the illustrated example line retainer 4000 includes: (1) a frame 4110 configured to connect onto a section of a vehicle, and (2) a body 4120 defining a line-receiving slot 4122 that is configured to receive and retain any one of a plurality of different lines having different outer diameters. The frame 4110 includes any suitable connection mechanism(s) to attach the line retainer 4000 to a section of the vehicle. The body 4120 extends from and is integrally and specifically monolithically suitably formed (such as via molding) formed with the frame 4110 of the line retainer 4000. In this illustrated example embodiment, the body 4120 defines one slot to enable the line retainer 4000 to retain one line at a time. It should be appreciated that the body can alternatively define multiple line-receiving slots that are arranged next to each other or that are spaced apart to enable the line retainer of the present disclosure to simultaneously retain multiple lines.

The body 4120 of the illustrated example line retainer 4000 includes: (1) a front end 4124, (2) a rear end 4126 opposite the front end 4124, (3) a base wall 4128, (4) a first side wall 4130 connected to the base wall 4128 and extending between the front end 4124 and the rear end 4126, (5) a second side wall 4132 connected to the base wall 4128 and extending between the front end 4124 and the rear end 4126 opposite and spaced apart from the first side wall 4130, and (6) a support wall 4134 connected to and extending transversely along the base wall 4128, the first side wall 4130, and the second side wall 4132 between the front end 4124 and the rear end 4126.

As best shown in FIG. 5C, the first and second side walls 4130 and 4132 each extend between the front end 4124 and the rear end 4126 to define a depth of the body 4120 of the line retainer 4000. The base wall 4128, the first and second side walls 4130 and 4132, and/or the support wall 4134 define the line-receiving slot 4122 configured to receive any one of a plurality of different lines having different outer diameters and in which such line is configured to be securely retained. The first and second side walls 4130 and 4132 also define an opening 4136 of the line-receiving slot 4122 that is opposite the base wall 4128 such that any of such different lines can be inserted into the line-receiving slot 4122 through the opening 4136.

The illustrated example line retainer 4000 also includes: (1) a set of opposing arms 4140, 4170, 4200, and 4230 extending into the line-receiving slot 4122 respectively from the first and second side walls 4130 and 4132 adjacent the opening 4136, and (2) a set of opposing legs 4260, 4290, 4320, and 4350 extending into the line-receiving slot 4122 from the base wall 4128 respectively adjacent the first and second side walls 4130 and 4132.

The set of opposing arms 4140, 4170, 4200, and 4230 includes: (1) a first arm 4140 that extends from the first side wall 4130 adjacent the front end 4124 of the body 4120, (2) a second arm 4170 that extends from the first side wall 4130 adjacent the rear end 4126 of the body 4120, (3) a third arm 4200 that extends from the second side wall 4132 adjacent the front end 4124 of the body 4120, and (4) a fourth arm 4230 that extends from the second side wall 4132 adjacent the rear end 4126 of the body 4120. The second arm 4170 is longitudinally aligned with and spaced apart from the first arm 4140. The fourth arm 4230 is longitudinally aligned with and spaced apart from the third arm 4200.

Figure 5B:
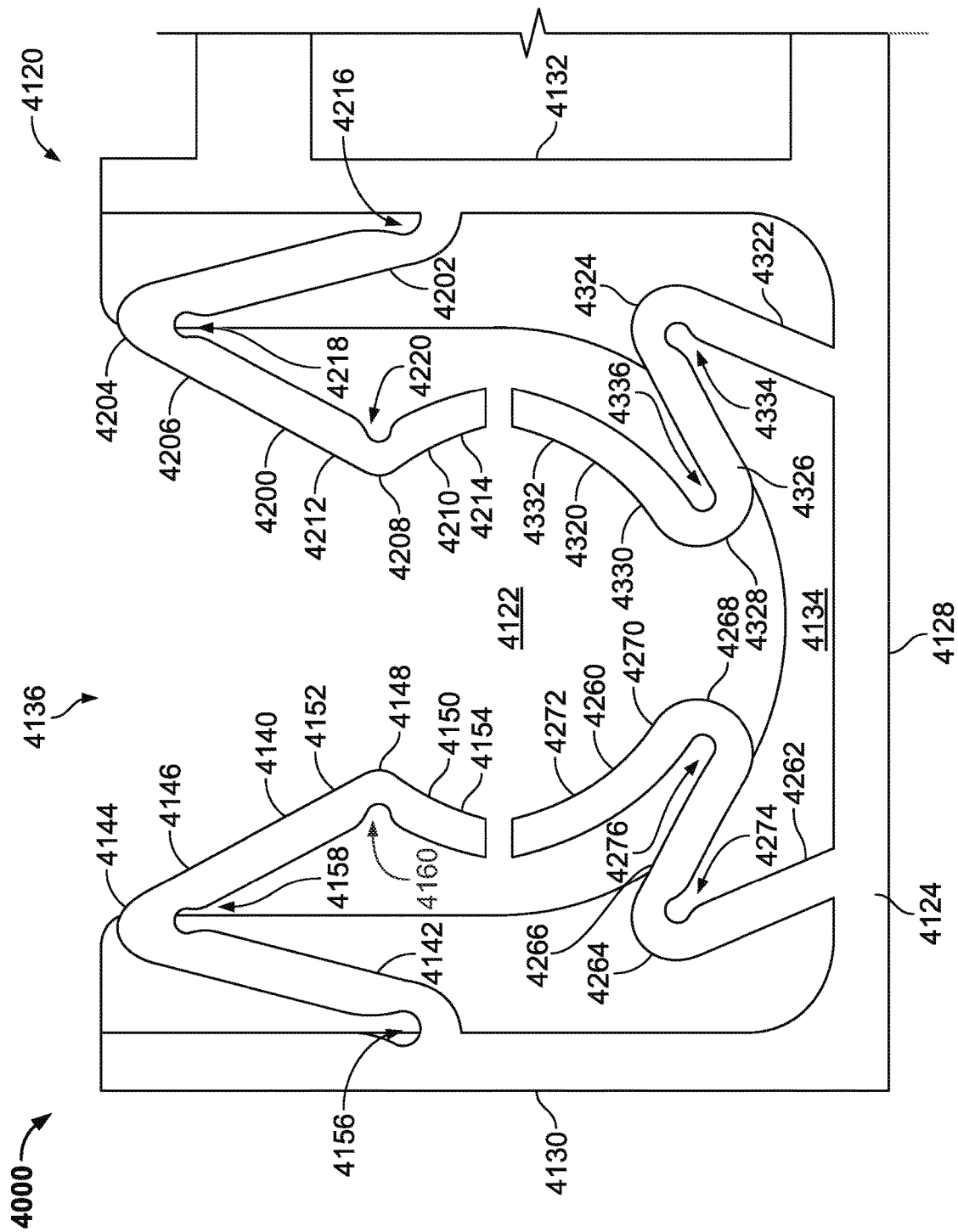
FIG. 5B is a fragmentary front view of a portion of the line retainer of FIG. 5A.

As best shown in FIG. 5B, the first arm 4140 includes: (1) a proximal segment 4142 that extends from the first side wall 4130 inwardly and toward the opening 4136, (2) a first bend 4144 extending from the proximal segment 4142 and having an acute angle, (3) an intermediate segment 4146 extending from the first bend 4144 inwardly and toward the base wall 4128 at an acute angle relative to the proximal segment 4142, (4) a second bend 4148 extending from the intermediate segment 4146 and having an obtuse angle, and (5) a distal segment 4150 extending from the second bend 4148 outwardly and toward the base wall 4128 at an obtuse angle relative to intermediate segment 4146. The intermediate segment 4146 defines a line-contact surface 4152 that is configured to contact any one of a plurality of differently-sized lines. The distal segment 4150 defines a line-retainment surface 4154 that is configured to contact and retain any one of the plurality of differently-sized lines. The line-retainment surface 4154 has a concave shape. The first side wall 4130 and the proximal segment 4142 defines a first notch 4156 to facilitate flexing of the first arm 4140. The first arm 4140 also defines: (1) a second notch 4158 adjacent the first bend 4144 and (2) a third notch 4160 adjacent the second bend 4148 to facilitate flexing of the first arm 4140.

The second arm 4170 is similar to the first arm 4140, except for its location with respect to the first side wall 4130 and the line-receiving slot 4122. Since the second arm 4170 is similar to the first arm 4140, only certain aspects of the second arm 4170 are described in this section for brevity. The features, functions, and alternatives described regarding the first arm 4140 thus also apply to the second arm 4170.

The third arm 4200 includes: (1) a proximal segment 4202 that extends from the second side wall 4132 inwardly and toward the opening 4136, (2) a first bend 4204 extending from the proximal segment 4202 and having an acute angle, (3) an intermediate segment 4206 extending from the first bend 4204 inwardly and toward the base wall 4128 at an acute angle relative to the proximal segment 4202, (4) a second bend 4208 extending from the intermediate segment 4206 and having an obtuse angle, and (5) a distal segment 4210 extending from the second bend 4208 outwardly and toward the base wall 4128 at an obtuse angle relative to the intermediate segment 4206. The intermediate segment 4206 defines a line-contact surface 4212 that is configured to contact any one of a plurality of differently-sized lines. The distal segment 4210 defines a line-retainment surface 4214 that is configured to contact and retain any one of the plurality of differently-sized lines. The line-retainment surface 4214 has a concave shape. The second side wall 4132 and the proximal segment 4202 defines a first notch 4216 to facilitate flexing of the third arm 4200. The third arm 4200 also defines: (1) a second notch 4218 adjacent the first bend 4204 and (2) a third notch 4220 adjacent the second bend 4208 to facilitate flexing of the third arm 4200.

The fourth arm 4230 is similar to the third arm 4200, except for its location with respect to the second side wall 4132 and the line-receiving slot 4122. Since the fourth arm 4230 is similar to the third arm 4200, only certain aspects of the fourth arm 4230 are described in this section for brevity. The features, functions, and alternatives described regarding the third arm 4200 thus also apply to the fourth arm 4230.

The set of opposing legs 4260, 4290, 4320, and 4350 includes: (1) a first leg 4260 that extends from the base wall 4128 adjacent the first side wall 4130 and the front end 4124 of the body 4120, (2) a second leg 4290 that extends from the base wall 4128 adjacent the first side wall 4130 and the rear end 4126 of the body 4120, (3) a third leg 4320 that extends from the base wall 4128 adjacent the second side wall 4132 and the front end 4124 and opposite the first leg 4260, and (4) a fourth leg 4350 that extends from the base wall 4128 adjacent the second side wall 4132 and the rear end 4126 and opposite the second leg 4290. The second leg 4290 is longitudinally aligned with and spaced apart from the first leg 4260. The fourth leg 4350 is longitudinally aligned with and spaced apart from the third leg 4320.

As best shown in FIG. 5B, the first leg 4260 includes: (1) a proximal segment 4262 that extends from the base wall 4128 toward the opening 4136 and the first side wall 4130, (2) a first bend 4264 extending from the proximal segment 4262 and having an acute angle, (3) an intermediate segment 4266 extending from the first bend 4264 inwardly and back toward the base wall 4128 at an acute angle relative to the proximal segment 4262, (4) a second bend 4268 extending from the intermediate segment 4266 and having an acute angle, and (5) a distal segment 4270 extending from the second bend 4268 outwardly and toward the opening 4136 at an acute angle relative to the intermediate segment 4266. The distal segment 4270 defines a line-contact surface 4272 that is configured to contact any one of a plurality of differently-sized lines. The line-contact surface 4272 has a concave shape. The first leg 4260 also defines: (1) a first notch 4274 adjacent the first bend 4264 and (2) a second notch 4276 adjacent the second bend 4268 to facilitate flexing of the first leg 4260.

The second leg 4290 is similar to the first leg 4260, except for its location with respect to the base wall 4128 and the line-receiving slot 4122. Since the second leg 4290 is similar to the first leg 4260, only certain aspects of the second leg 4290 are described in this section for brevity. The features, functions, and alternatives described regarding the first leg 4260 thus also apply to the second leg 4290.

As best shown in FIG. 5B, the third leg 4320 includes: (1) a proximal segment 4322 that extends from the base wall 4128 toward the opening 4136 and the second side wall 4132, (2) a first bend 4324 extending from the proximal segment 4322 and having an acute angle, (3) an intermediate segment 4326 extending from the first bend 4324 inwardly and back toward the base wall 4128 at an acute angle relative to the proximal segment 4322, (4) a second bend 4328 extending from the intermediate segment 4326 and having an acute angle, and (5) a distal segment 4330 extending from the second bend 4328 outwardly and toward the opening 4136 at an acute angle relative to the intermediate segment 4326. The distal segment 4330 defines a line-contact surface 4332 that is configured to contact any one of a plurality of differently-sized lines. The line-contact surface 4332 has a concave shape. The third leg 4320 also defines: (1) a first notch 4334 adjacent the first bend 4324 and (2) a second notch 4336 adjacent the second bend 4328 to facilitate flexing of the third leg 4320.

The fourth leg 4350 is similar to the third leg 4320, except for its location with respect to the base wall 4128 and the line-receiving slot 4122. Since the fourth leg 4350 is similar to the third leg 4320, only certain aspects of the fourth leg 4350 are described in this section for brevity. The features, functions, and alternatives described regarding the third leg 4320 thus also apply to the fourth leg 4350.

The frame 4110; the body 4120; the set of opposing arms 4140, 4170, 4200, and 4230; and the set of opposing legs 4260, 4290, 4320, and 4350 of the illustrated example line retainer 4000 are integrally and specifically monolithically suitably formed (such as via molding) of a semi-rigid material, such as but not limited to nylon, acetyl, and/or other plastic(s) or combinations thereof. The semi-rigid material enables the set of opposing arms 4140, 4170, 4200, and 4230 and the set of opposing legs 4260, 4290, 4320, and 4350 to flex (1) to enable any one of a plurality of different lines having different outer diameters to be inserted into the line-receiving slot 4122 through the opening 4136 and (2) to accommodate such lines having different outer diameters (such as outer diameters between about 8 millimeters and 12 millimeters). The flexibility of the semi-rigid material and the arrangement of the set of opposing arms 4140, 4170, 4200, and 4230 and the set of opposing legs 4260, 4290, 4320, and 4350 enable any such line to be inserted into the line-receiving slot 4122 with an insertion force that can be easily applied by an assembler. The rigidity of the semi-rigid material and the arrangement of the set of opposing arms 4140, 4170, 4200, and 4230 and the set of opposing legs 4260, 4290, 4320, and 4350 also provide a rigidity that inhibits the line from being removed from the line-receiving slot 4122 through the opening 4136 unless an extraction force that is greater than the insertion force is applied.

When a line is inserted through the opening 4136 toward the line-receiving slot 4122, (1) the line-contact surfaces 4152 and 4212 of the set of opposing arms 4140 and 4200, and the respective line-contact surfaces of 4170 and 4230, engage the line and (2) the intermediate segments 4146 and 4206 and the distal segments 4150 and 4210 flex outwardly from respective rest positions toward the first and second side walls 4130 and 4132. As the line is pushed further into the opening 4136, the intermediate segments 4146 and 4206 and the distal segments 4150 and 4210 begin to snap back toward their respective rest positions until the line reaches a retained position within the line-receiving slot 4122. When the line is in the retained position, the line-retainment surfaces 4154 and 4214 of the set of opposing arms 4140 and 4200, and the respective line-retainment surfaces of 4170 and 4230, and the line-contact surfaces 4272 and 4332 of the set of opposing legs 4260 and 4320, and the respective line-contact surfaces of 4290 and 4350, engage the line to secure the line in a retained position within the line-receiving slot 4122.

Figure 5D:
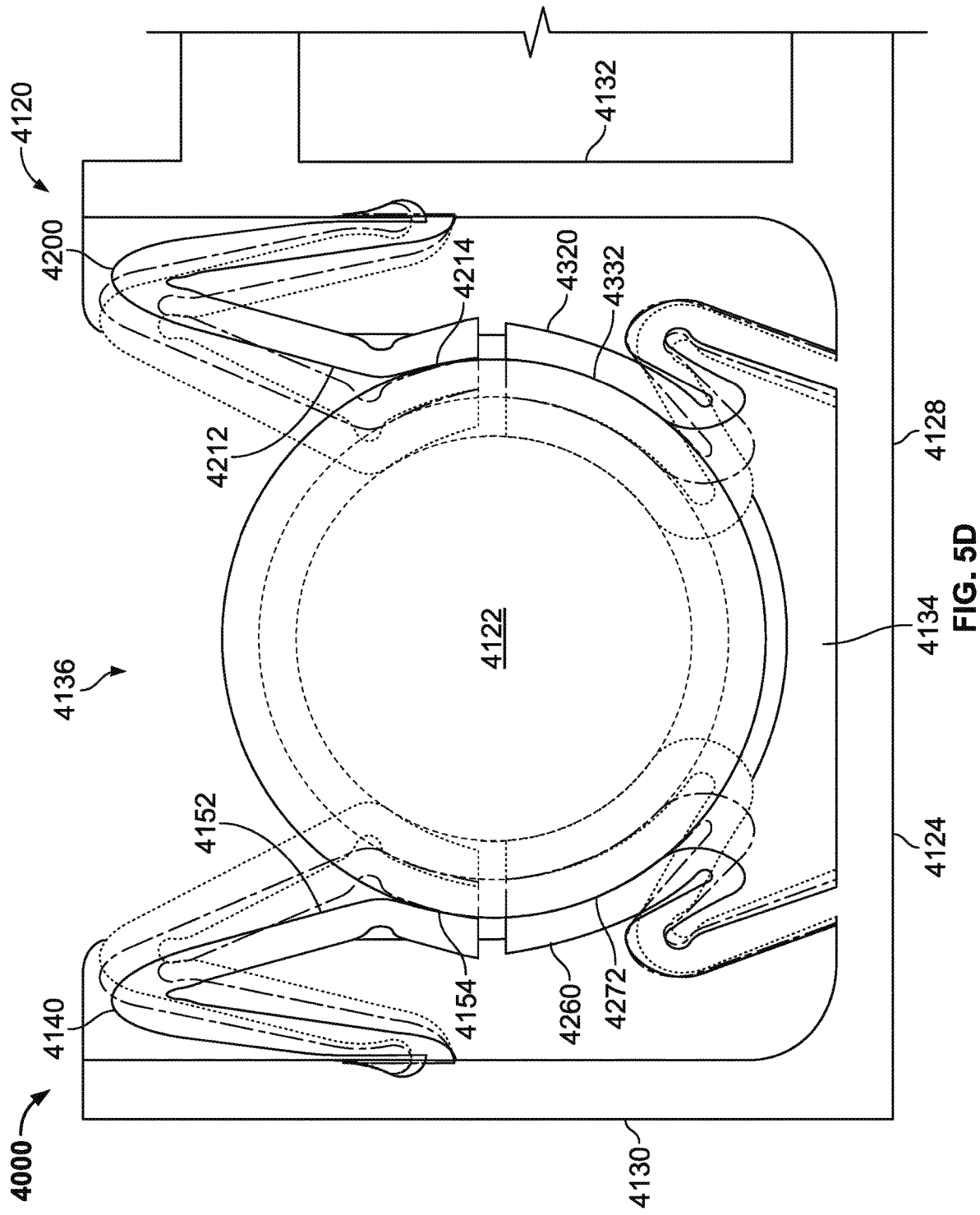
FIG. 5D is a fragmentary front view that depicts arms and legs of the line retainer of FIG. 5A in a set of solid lines when retaining a first-sized line, in a first set of dashed lines when alternatively retaining a second-sized line, and in a second set of dashed lines when alternatively retaining a third-sized line.

As best shown in FIG. 5D, the positioning of the set of opposing arms 4140, 4170, 4200, 4230 and the set of opposing legs 4260, 4290, 4320, and 4350 varies when the line is in the retained position based on the size of the line. A solid set of lines depict a relatively large-sized line (such as a line having a 12 millimeter outer diameter), a first dashed set of lines depict a relatively small-sized line (such as a line having an 8 millimeter outer diameter), and second dashed set of lines depict an intermediate-sized line (such as a line having a 10 millimeter outer diameter). The set of opposing arms 4140, 4170, 4200, 4230 and the set of opposing legs 4260, 4290, 4320, and 4350 are flexed outward to retain the large-sized line. The set of opposing arms 4140, 4170, 4200, 4230 and the set of opposing legs 4260, 4290, 4320, and 4350 are in respective rest positions to retain the small-sized line. The set of opposing arms 4140, 4170, 4200, 4230 and the set of opposing legs 4260, 4290, 4320, and 4350 are flexed outward in an intermediate position to retain the intermediate-sized line.

FIG. 6 illustrates another example embodiment of a line retainer of the present disclosure that is generally indicated by numeral 5000. The illustrated example line retainer 5000 includes: (1) a frame 5110 configured to connect onto a section of a vehicle, and (2) a body 5120 defining a line-receiving slot 5122 and an opening 5156 for any one of a plurality of different lines having different outer diameters. The frame 5110 and the body 5120 are similar to the frame 110 and the body 120, respectively, FIGS. 1A, 1B, 1C, 1D, and 1E. For example, the body 5120 includes a base wall 5128, a first side wall 5130, and a second side wall 5132 that are similar to the base wall 128, the first side wall 130, and the second side wall 132, respectively, of the body 120 of FIGS. 1A, 1B, 1C, 1D, and 1E. Thus, only certain aspects of the body 5120 are described in this section for brevity. The features, functions, and alternatives described regarding the body 120 thus also apply to the body 5120, unless otherwise disclosed below.

The body 5120 of the illustrated example line retainer 5000 also includes a rear support wall 5136 that extends along a rear end of the body 5120 transversely between the first side wall 5130 and the second side wall 5132. As shown in FIG. 6, the rear support wall 5136 forms a circumferential arc that is configured to contact and support a line positioned within the slot 5122. Additionally or alternatively, the body 5120 may include a similarly-shaped front support wall for contacting and supporting a line.

As shown in FIG. 6, the second side wall 5132 defines: (1) an inwardly-extending surface 5135 and (2) a circumferential recess 5137 adjacent the inwardly-extending surface 5135. The inwardly-extending surface 5135 is positioned adjacent the opening 5156 and extends inwardly toward the first side wall 5130 and downwardly toward the base wall 5128. The circumferential recess 5137 is positioned between the base wall 5128 and the inwardly-extending surface 5135. The circumferential recess 5137 is configured to at least partially contact and secure a line positioned within the slot 5122.

The illustrated example line retainer 5000 also includes: (1) arms 5160 and 5180 extending into the line-receiving slot 5122 from the first side wall 5130 adjacent the opening 5156 and opposite the inwardly-extending surface 5135 of the second side wall 5132 and (2) a leg 5300 extending into the line-receiving slot 5122 from the second side wall 1132. The arms 5160 and 5180 include a first arm 5160 and a second arm 5180.

The first arm 5160 and the second arm 5180 are similar to the first arm 160 and the second arm 180, respectively, of the line retainer 100 of FIGS. 1A, 1B, 1C, 1D, and 1E. Thus, only certain aspects of the first arm 5160 and the second arm 5180 are described in this section for brevity. Features, functions, and alternatives described regarding the first arm 160 and the second arm 180 thus also apply to the first arm 5160 and the second arm 5180, respectively, unless otherwise disclosed below. For example, the first and second arms 5160 are sized, shaped, and oriented such that (1) respective line-contact surfaces 5170 and 5190 are configured to engage a larger-sized line to retain the larger-sized line within the line-receiving slot 5122 and (2) respective distal ends 5168 and 5188 are configured to engage a smaller-sized line to retain the smaller-sized line within the line-receiving slot 5122.

The leg 5300 is similar to the second leg 300 of the line retainer 100 of FIGS. 1A, 1B, 1C, 1D, and 1E. Thus, only certain aspects of the leg 5300 are described in this section for brevity. Features, functions, and alternatives described regarding the second leg 300 also apply to the leg 5300, unless otherwise disclosed below. As shown in FIG. 6, the leg 5300 has a concave shape to receive and engage a portion of a line positioned within the slot 5122. The leg 5300 extends from the circumferential recess 5137. The leg 5300 has a similar curvature to the curvature of the circumferential recess 5137 to facilitate the secure receipt of the line within the slot 5122.

It should be appreciated that the combination of the arms 5160 and 5180 extending from the first sidewall 5130, the leg 5300 extending from the second side wall 5132, and the circumferential recess 5137 defined by the second side wall 5132 enable the line retainer 5000 to securely retain any one of a range of differently-sized lines within the line-receiving slot 5122. While the line retainer 5000 includes one or more arms and one or more legs that are similar to those of the line retainer 100, it should be understood that other line retainers in accordance with the principles of the present disclosure include a combination of a circumferential recess on one side with one or more arms and one or more legs of other example line retainers, such as the line retainers 1000, 2000, 3000, and/or 4000, to securely retain any one of a range of differently-sized lines within a line-receiving slot.

It should be appreciated that the example embodiments of a line retainer described above provide the advantages of securely retaining any one of a range of differently-sized lines to reduce the quantity of different line retainers that need to be purchased, stocked, and tracked, and/or to reduce the assembly time by reducing the quantity of different components that are used to assemble a vehicle.

Various changes and modifications to the present embodiments described herein will be apparent to those skilled in the art. Such changes and modifications can be made without departing from the spirit and scope of the present subject matter and without diminishing its intended advantages. For example, it should be appreciated that the sets of opposing arms and the sets of opposing legs of the embodiments described herein are interchangeable such that any set of opposing arms of one embodiment described herein may be used with any set of opposing legs of another embodiment described herein. It is therefore intended that such changes and modifications be covered by the appended claims.

The claims are as follows:

1. A line retainer comprising:
a body including:
a front end;
a rear end;
a first side wall;
a second side wall spaced apart from the first side wall;
the first and second side walls partially defining a line-receiving slot configured to receive any one of a plurality of differently-sized lines including a first-sized line and a different second-sized line, the first-sized line having a larger outer diameter than that of the second-sized line;
the first and second side walls defining an opening of the line-receiving slot;
a set of opposing legs extending into the line-receiving slot from the first and second side walls, wherein the set of opposing legs includes:
a first leg extending from the first side wall; and
a second leg extending from the second side wall opposite the first leg,
each leg of the set of opposing legs being offset from and located between the front end and the rear end of the body, each leg of the set of opposing legs being flexible and having a convex shape, each leg having a line-contact surface that has a convex shape and is configured to receive and engage a portion of any one of the plurality of differently-sized lines, each leg of the set of opposing legs including a proximal end and a distal end and defining a notch located between the proximal end and the distal end;
a first set of opposing arms extending into the line-receiving slot from the first and second side walls adjacent the opening, the first set of opposing arms engageable with the first-sized line when the first-sized line is positioned in the line-receiving slot; and
a second set of opposing arms extending into the line-receiving slot from the first and second side walls between the first set of opposing arms and the set of opposing legs, the second set of opposing arms engageable with the second-sized line when the second-sized line is positioned in the line-receiving slot.

2. The line retainer of claim 1, wherein the first set of opposing arms includes:
a first arm extending from the first side wall adjacent the front end of the body;
a second arm extending from the first side wall adjacent the rear end of the body, the second arm aligned with and spaced apart from the first arm;
a third arm extending from the second side wall adjacent the front end and opposite the first arm; and
a fourth arm extending from the second side wall adjacent the rear end and opposite the second arm, the fourth arm aligned with and spaced apart from the third arm.

3. The line retainer of claim 2, wherein the second set of opposing arms includes:
a fifth arm extending from the first side wall; and
a sixth arm extending from the second side wall opposite the fifth arm,
each arm of the second set of opposing arms being offset from and located between the front end and the rear end of the body,
the first set of opposing arms and the second set of opposing arms being staggered with respect to each other.

4. The line retainer of claim 1, wherein each arm of the first set of opposing arms and the second set of opposing arms includes:
a first segment that extends inwardly from one of the first and second side walls; and
a second segment that extends from the first segment, the second segment including a proximal end connected to the first segment and a distal end that is thicker than the proximal end.

5. The line retainer of claim 1, wherein each arm the first set of opposing arms and the second set of opposing arms is biased toward a rest position such that the arm is:
pivotable from the rest position as the line is inserted through the opening and into the line-receiving slot; and biased to return toward the rest position for retainment of the line within the line-receiving slot.

6. The line retainer of claim 5, wherein the first side wall defines a first indentation and the second side defines a second indentation, each of the first and second indentations sized and arranged to receive a distal end of a respective one of the second set of opposing arms to enable the first-sized line to be positioned and retained within the line-receiving slot.

7. The line retainer of claim 5, wherein each arm of the second set of opposing arms pivotable from the rest position to an intermediate position to engage a third-sized line positioned within the line-receiving slot, the third-sized line having an outer diameter between that of the first-sized line and the second-sized line.

8. A line retainer comprising:
a body including:
a base wall;
a first side wall extending from the base wall; and
a second side wall extending from the base wall and spaced apart from the first side wall;
the base wall and the first and second side walls defining a line-receiving slot engageable with any one of a plurality of differently-sized lines;
the first and second side walls defining an opening of the line-receiving slot that is opposite the base wall;
a first set of opposing legs extending into the line-receiving slot from the first and second side walls adjacent the base wall, wherein the first set of opposing legs includes:
a first leg extending from the first side wall adjacent a front end of the body;
a second leg extending from the first side wall adjacent a rear end of the body, the second leg aligned with and spaced apart from the first leg;
a third leg extending from the second side wall adjacent the front end and opposite the first leg; and
a fourth leg extending from the second side wall adjacent the rear end and opposite the second leg, the fourth leg aligned with and spaced apart from the third leg; and
a set of opposing arms extending into the line-receiving slot from the first and second side walls adjacent the opening, each arm of the set of opposing arms including:
a proximal segment extending from the first side wall or the second side in a direction at least partially away from the base wall;
an intermediate segment that extends from the proximal segment in a direction at least partially toward the base wall and inwardly toward the line-receiving slot; and
a distal segment extending into the line-receiving slot from the intermediate segment in a direction at least partially toward the base wall.

9. The liner retainer of claim 8, wherein each arm of the set of opposing arms extends a depth of the body between the front end and the rear end, the set of opposing arms including a first arm that extends from the first side wall and a second arm that extends from the second side wall.

10. The line retainer of claim 8, wherein the set of opposing arms includes:
a first arm extending from the first side wall adjacent the front end of the body;
a second arm extending from the first side wall adjacent the rear end of the body, the second arm aligned with and spaced apart from the first arm;
a third arm extending from the second side wall adjacent the front end and opposite the first arm; and
a fourth arm extending from the second side wall adjacent the rear end and opposite the second arm, the fourth arm aligned with and spaced apart from the third arm.

11. The line retainer of claim 8, wherein each arm of the set of opposing arms defines a notch between the intermediate and distal segments to facilitate flexing of the distal end as the line is inserted into the line-receiving slot through the opening.

12. A line retainer comprising:
a body including:
a base wall;
a first side wall extending from the base wall; and
a second side wall extending from the base wall and spaced apart from the first side wall;
the base wall and the first and second side walls defining a line-receiving slot engageable with any one of a plurality of differently-sized lines;
the first and second side walls defining an opening of the line-receiving slot that is opposite the base wall;
a first set of opposing legs extending into the line-receiving slot from the first and second side walls adjacent the base wall, wherein each leg of the first set of opposing legs includes:
a proximal segment extending inwardly into the line-receiving slot;
a first intermediate segment extending at a first obtuse angle relative to the proximal segment;
a second intermediate segment extending toward the base wall at a first acute angle relative to the first intermediate segment;
a third intermediate segment extending outwardly at a second obtuse angle relative to the second intermediate segment;
a fourth intermediate segment extending inwardly at a second acute angle relative to the third intermediate segment; and
a distal segment extending inwardly and toward the base wall at a third obtuse angle relative to the fourth intermediate segment, the distal segment defining a line-contact surface engageable with any one of the plurality of differently-sized lines; and
a set of opposing arms extending into the line-receiving slot from the first and second side walls adjacent the opening, each arm of the set of opposing arms including:
a proximal segment extending from the first side wall or the second side in a direction at least partially away from the base wall;
an intermediate segment that extends from the proximal segment in a direction at least partially toward the base wall and inwardly toward the line-receiving slot; and
a distal segment extending into the line-receiving slot from the intermediate segment in a direction at least partially toward the base wall.

13. The line retainer of claim 8, further comprising a second set of opposing legs, each leg of the second set of opposing legs positioned adjacent a respective leg of the first set of opposing legs, each leg of the first set of opposing legs extending inwardly into the line-receiving slot and at least partially toward the base wall, each leg of the second set of opposing legs extending inwardly into the line-receiving slot and at least partially toward the opening of the line-receiving slot.

14. A line retainer comprising:
a body including:
a base wall;
a first side wall extending from the base wall; and
a second side wall extending from the base wall and spaced apart from the first side wall;
the base wall and the first and second side walls defining a line-receiving slot configured to receive any one of a plurality of differently-sized lines;
the first and second side walls defining an opening of the line-receiving slot that is opposite the base wall;
a set of opposing legs extending into the line-receiving slot from the base wall, each leg of the set of opposing legs including:
a proximal leg segment extending toward the opening;
an intermediate leg segment extending inwardly and toward the base wall at a first acute angle relative to the proximal leg segment; and
a distal leg segment extending outwardly and away from the base wall at a second acute angle relative to the intermediate leg segment, the distal segment defining a line-retainment leg surface; and
a set of opposing arms extending into the line-receiving slot from the first and second side walls adjacent the opening, each arm of the set of opposing arms including:
a proximal arm segment extending inwardly and toward the opening;
an intermediate arm segment extending inwardly and toward the base wall at a third acute angle relative to the proximal arm segment; and
a distal arm segment extending outwardly and toward the base wall at an obtuse angle relative to the intermediate arm segment, the distal arm segment defining a line-retainment arm surface.

15. The line retainer of claim 14, wherein the set of opposing arms includes:
a first arm extending from the first side wall adjacent a front end of the body;
a second arm extending from the first side wall adjacent a rear end of the body, the second arm aligned with and spaced apart from the first arm;
a third arm extending from the second side wall adjacent the front end and opposite the first arm; and
a fourth arm extending from the second side wall adjacent the rear end and opposite the second arm, the fourth arm aligned with and spaced apart from the third arm.

16. The line retainer of claim 14, wherein the set of opposing legs includes:
a first leg extending adjacent the first side wall and a front end of the body;
a second leg extending adjacent the first side wall and a rear end of the body, the second leg aligned with and spaced apart from the first leg;
a third leg extending adjacent the second side wall and the front end and opposite the first leg; and
a fourth leg extending adjacent the second side wall and the rear end and opposite the second leg, the fourth leg aligned with and spaced apart from the third leg.

* * * * *